US012752351B2

United States Patent
Noshita et al.

(12) United States Patent
(10) Patent No.: US 12,752,351 B2
(45) Date of Patent: Oct. 6, 2026

(54) CUTTING INSERT, TOOL BODY, AND EDGE-REPLACEABLE ROTARY CUTTING TOOL

(71) Applicant: MOLDINO Tool Engineering, Ltd., Tokyo (JP)

(72) Inventors: Masashi Noshita, Narita (JP); Sho Uemoto, Narita (JP); Yoshimitsu Nagashima, Narita (JP); Yoshiyuki Kobayashi, Narita (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 234 days.

(21) Appl. No.: 18/832,531

(22) PCT Filed: Feb. 21, 2023

(86) PCT No.: PCT/JP2023/006128

§ 371 (c)(1),
(2) Date: Jul. 24, 2024

(87) PCT Pub. No.: WO2023/171359

PCT Pub. Date: Sep. 14, 2023

(65) Prior Publication Data

US 2025/0144725 A1 May 8, 2025

(30) Foreign Application Priority Data

Mar. 8, 2022 (JP) ................................ 2022-035460

(51) Int. Cl.
*B23C 5/20* (2006.01)
*B23B 27/22* (2006.01)
*B23C 5/06* (2006.01)

(52) U.S. Cl.
CPC ................ *B23C 5/202* (2013.01); *B23C 5/06* (2013.01); *B23C 2200/08* (2013.01); *B23C 2210/486* (2013.01)

(58) Field of Classification Search
CPC ....... B23C 5/202; B23C 5/06; B23C 2200/08; B23C 5/205; B23C 2200/0461;
(Continued)

(56) References Cited

U.S. PATENT DOCUMENTS 3,407,467 A * 10/1968 Wirfelt ................. B23B 27/143 407/114
4,312,250 A * 1/1982 Yankoff ................ B23B 27/143 82/1.11
(Continued)

FOREIGN PATENT DOCUMENTS

EP 577011 A1 * 6/1993 ............... B23C 5/20
EP 1584390 A2 * 10/2005 ............ B23C 5/202
(Continued)

OTHER PUBLICATIONS

Office Action mailed Jan. 9, 2026, issued for KR10-2024-7025563 and English translation thereof.
(Continued)

*Primary Examiner* — Sara Addisu
(74) *Attorney, Agent, or Firm* — Troutman Pepper Locke LLP

(57) ABSTRACT

A rake surface of a cutting insert according to the present disclosure is formed with a first plane parallel to a seating surface. An outer periphery of the first plane includes a plurality of curved portions having different radii of curvature. On the rake surface, a breaker is provided between a cutting edge portion and the first plane around an entire circumference of the cutting insert. When a distance from the seating surface to a tip of the cutting edge portion in a
(Continued)

thickness direction is denoted by L11, a distance from the seating surface to the first plane in the thickness direction is denoted by L12, and a distance from the seating surface to a deepest portion of the breaker in the thickness direction is denoted by L13, a relationship of L11>L12>L13 is satisfied over an entire circumference of the cutting edge portion.

20 Claims, 11 Drawing Sheets

(58) Field of Classification Search
CPC ........ B23C 2200/203; B23C 2210/486; B23B 2200/0476; B23B 2200/323
See application file for complete search history.

(56) References Cited

U.S. PATENT DOCUMENTS

| | | | | |
|---|---|---|---|---|
| 4,318,645 | A * | 3/1982 | McCreery | B23B 27/143 D15/139 |
| 4,859,122 | A * | 8/1989 | Patterson | B23B 27/143 407/116 |
| 5,116,167 | A * | 5/1992 | Niebauer | B23B 27/143 D15/139 |
| 5,122,017 | A * | 6/1992 | Niebauer | B23B 27/143 407/115 |
| 5,476,346 | A * | 12/1995 | Lundstrom | B23B 27/143 407/116 |
| 5,743,681 | A * | 4/1998 | Wiman | B23B 27/143 407/116 |
| 6,065,907 | A * | 5/2000 | Ghosh | B23B 27/141 407/115 |
| 6,599,061 | B1 * | 7/2003 | Nelson | B23B 27/143 407/115 |
| 7,040,844 | B1 * | 5/2006 | Daiguji | B23C 5/2213 407/113 |
| 7,234,901 | B2 * | 6/2007 | Ishida | B23B 27/141 407/115 |
| 7,494,302 | B2 * | 2/2009 | Ishida | B23B 27/141 407/115 |
| 2005/0019111 | A1 * | 1/2005 | Kitagawa | B23B 27/141 407/113 |
| 2005/0214080 | A1 * | 9/2005 | Satran | B23C 5/202 407/113 |
| 2005/0254908 | A1 * | 11/2005 | Norstrom | B23B 27/145 407/113 |
| 2009/0226269 | A1 * | 9/2009 | Iyori | B23B 27/143 407/113 |
| 2010/0034602 | A1 * | 2/2010 | Sung | B23C 5/202 407/113 |
| 2011/0058909 | A1 * | 3/2011 | Matsuzawa | C23C 14/0664 407/119 |
| 2012/0093596 | A1 * | 4/2012 | Ishi | B23C 5/202 407/113 |
| 2012/0189396 | A1 * | 7/2012 | Xu | B23C 5/06 407/42 |
| 2013/0129432 | A1 * | 5/2013 | Jaeger | B23C 5/2213 407/42 |
| 2014/0212235 | A1 | 7/2014 | Prast et al. | |
| 2015/0090081 | A1 * | 4/2015 | Onodera | B23B 27/143 407/66 |
| 2015/0174664 | A1 * | 6/2015 | Nam | B23B 27/145 407/116 |
| 2015/0283617 | A1 * | 10/2015 | Nagarajan | B23B 27/143 407/114 |
| 2015/0375303 | A1 * | 12/2015 | Fujii | B23B 27/143 407/66 |
| 2016/0082518 | A1 * | 3/2016 | Sakai | B23B 27/143 407/115 |
| 2016/0158854 | A1 | 6/2016 | Ishi | |
| 2019/0039152 | A1 * | 2/2019 | Ikeda | B23B 27/143 |

FOREIGN PATENT DOCUMENTS

| | | | | | |
|---|---|---|---|---|---|
| JP | H10-100015 | A | | 4/1998 | |
| JP | H10-138033 | A | | 5/1998 | |
| JP | 2004106150 | A | * | 4/2004 | |
| JP | 2006102398 | A | * | 3/2005 | B23C 5/20 |
| JP | 2005-342871 | A | | 12/2005 | |
| JP | 2008073827 | A | * | 4/2008 | |
| JP | 2009006437 | A | * | 1/2009 | |
| JP | 5287426 | B2 | | 9/2013 | |
| JP | 2014-083632 | A | | 5/2014 | |
| JP | 5952073 | B2 | | 7/2016 | |
| JP | 2017-164849 | A | | 9/2017 | |
| JP | 2022-174559 | A | | 11/2022 | |
| KR | 10-2014-0023405 | A | | 2/2014 | |
| KR | 10-2016-0019952 | A | | 2/2016 | |
| WO | WO-9601164 | A1 | * | 1/1996 | B23B 27/143 |
| WO | 2009/157850 | A1 | | 12/2009 | |
| WO | WO-2013187596 | A1 | * | 12/2013 | B23C 5/202 |

OTHER PUBLICATIONS

Office Action mailed Sep. 24, 2025, issued for JP2024-506036 and English translation thereof.
Supplementary European Search Report mailed Feb. 13, 2026, issued for EP23766537.7.
International Search Report mailed May 16, 2023, issued for PCT/JP2023/006128 and English translation thereof.
Notice of Allowance mailed May 13, 2026, issued for KR10-2024-7025563 and English translation thereopf.

* cited by examiner

III—III

IV—IV

V—V

CUTTING INSERT, TOOL BODY, AND EDGE-REPLACEABLE ROTARY CUTTING TOOL

TECHNICAL FIELD

The present invention relates to a cutting insert, a tool body, and an edge-replaceable rotary cutting tool.

Priority is claimed on Japanese Patent Application No. 2022-035460, filed Mar. 8, 2022, the content of which is incorporated herein by reference.

BACKGROUND ART

It is known that a breaker (an "inclined surface" in Patent Document 1) is formed on a rake surface from a cutting edge toward an inside of the rake surface, and a rake angle of the cutting edge is set to a positive value, whereby a cutting resistance can be reduced, a cutting load can be reduced in highly efficient machining such as rough machining, and as a result, a burden on a cutting tool or a machining machine can be reduced.

In addition, Patent Document 1 discloses a configuration in which a land is formed to be inscribed on a main cutting edge of a rake surface. In addition, a breaker connected to the land is inclined to be lower toward an inside of the rake surface. The breaker is formed such that the inclination becomes steeper as a distance from a corner part increases, and is formed such that an inclination length is the longest at a central portion of each side edge of the main cutting edge. That is, a width of the breaker is the widest at a central portion of the main cutting edge. Therefore, the inclination length is the longest at the central portion of each side edge of the main cutting edge. As a result, Patent Document 1 discloses that no excessive deformation is applied to chips produced in a case of deep cutting and an increase in cutting resistance caused by chip clogging or chip deformation is suppressed.

In addition, Patent Document 1 discloses that, in machining such as face milling, since cutting edge chipping frequently occurs at a corner where the main cutting edge and a sub-cutting edge intersect is high, a resistance to the chipping is enhanced by increasing a width of the land.

CITATION LIST

Patent Document

[Patent Document 1]
Japanese Unexamined Patent Application, First Publication No H10-138033

SUMMARY OF INVENTION

Technical Problem

However, in a first embodiment of Patent Document 1 (FIGS. 1 to 5 of Patent Document 1), the breaker along the main cutting edge is formed as a continuous integral surface that is gradually changed such that a rake angle increases toward a center of the main cutting edge. Therefore, since an outflow speed of chips within chip width changes depending on a cutting depth, a discharge direction of the chips changes depending on the cutting depth. Therefore, in shape machining using a rotary cutting tool other than the face milling cutter assumed in Patent Document 1, particularly a high feed tool, the chips are discharged in a direction toward a machined wall surface, and there is a risk of damaging the machined wall surface.

In addition, in a second embodiment of Patent Document 1, a configuration is disclosed in which a breaker wall is provided between the breaker and a surface (boss surface) around an attachment hole. That is, a deepest portion of the breaker wall (breaker deepest portion) is not the boss surface. However, in Patent Document 1, a position of the breaker deepest portion is only shown in drawings and a detailed positional relationship is not described. Therefore, in a case where the position of the breaker wall is too lower than the cutting edge, the chips may not come into contact with the breaker wall and may be elongated, and thus the chips may come into contact with an unused cutting edge portion of the cutting insert, which may damage the cutting edge portion.

Further, in all embodiments of Patent Document 1, there is no description about a positional relationship of surfaces around the attachment hole due to the provision of the breaker, and since the provision of the breaker reduces a thickness of an insert relative to an edge height from an insert bottom surface, there is a risk that a strength of the insert itself is reduced in a case where the breaker is formed deeply. Therefore, in a case where high-efficiency machining typified by high feed machining is performed, the influence of the reduction in insert strength is more pronounced than the effect of suppressing the increase in cutting resistance, and there is a risk that the insert is damaged at an early stage.

The present invention has been made in view of such circumstances, and can provide a cutting insert that is capable of improving chip discharge performance of a cutting insert attached to a rotating tool body and that has an enhanced strength of a cutting edge portion, a tool body including such a cutting insert, and an edge-replaceable rotary cutting tool.

Solution to Problem

According to one aspect of the present invention, there is provided a cutting insert of a positive type that is attached to a tool body rotating around a rotation axis and that has a polygonal plate shape rotationally symmetrical with respect to a center line extending in a thickness direction, the cutting insert including: a rake surface that constitutes one of a pair of polygonal surfaces; a seating surface that constitutes the other of the pair of polygonal surfaces; a side surface that connects the rake surface and the seating surface; a cutting edge portion that is formed at an intersecting ridge between the rake surface and the side surface and that includes a main cutting edge located at a side part of the rake surface, a sub-cutting edge connected to one end side of the main cutting edge, and a corner edge connected to an end part of the sub-cutting edge on an opposite side to a main cutting edge side and located at a corner part of the rake surface; and an attachment hole that penetrates the cutting insert in the thickness direction and that is used for attaching the cutting insert to the tool body, in which the rake surface is formed with a first plane parallel to the seating surface, an outer periphery of the first plane includes a plurality of curved portions having different radii of curvature, and the outer periphery of the first plane in the vicinity of the corner part is formed to project toward the side surface of the cutting insert in the vicinity of the corner part, on the rake surface, a breaker including a first inclined surface and a second inclined surface is provided between the cutting edge portion and the first plane around an entire circumference of the cutting insert, and when a distance from the seating surface to a tip of the cutting edge portion in the thickness direction is denoted by L11, a distance from the seating surface to the first plane in the thickness direction is denoted by L12, and a distance from the seating surface to a deepest portion of the breaker in the thickness direction is denoted by L13, a relationship of L11>L12>L13 is satisfied over an entire circumference of the cutting edge portion.

With this configuration, since chip discharge performance is ensured by the breaker provided on the entire circumference of the cutting insert, it is possible to suppress damage to an unused cutting edge portion caused when chips generated at the cutting edge portion in use come into contact with the unused cutting edge portion. In addition, since the chip discharge performance is good, an increase in cutting resistance caused by chip clogging or chip deformation can be suppressed. Further, since the outer periphery of the first plane in the vicinity of the corner part is formed to project toward the side surface of the cutting insert in the vicinity of the corner part, a thickness at the corner part can be ensured even in a configuration including the breaker. In addition, in the thickness direction of the cutting insert, the distance L12 from the seating surface to the first plane is smaller than the distance L11 from the seating surface to the tip of the cutting edge portion, and is larger than the distance L13 from the seating surface to the deepest portion of the breaker. By adopting a shape with such a distance relationship, even in a shape in which the breaker is provided on a rake surface side, the thickness of a cutting insert 1 can be sufficiently ensured, and a strength of the cutting insert 1 can be increased. In addition, it is possible to suppress the damage to the unused cutting edge portion by the generated chips while ensuring the chip discharge performance via the breaker. As a result, a cutting insert capable of sufficiently exhibiting the effect of reducing the cutting resistance is obtained.

In addition, it is possible to suppress the clogging of chips not only in face milling but also in shape machining where a machined surface has a complicated shape, thereby realizing high-efficiency machining, while the breaker is provided.

In the aspect of the present invention, a difference between the distance L11 and the distance L12 may be within a range of 0.01 mm or more and less than 0.15 mm, and a difference between the distance L11 and the distance L13 may be within a range of 0.15 mm or more and 0.25 mm or less.

With this configuration, a cross sectional area of the cutting insert can be increased while the breaker is provided, so that it is possible to achieve both the effect of reducing the cutting resistance and the effect of improving the strength of the cutting insert.

In the aspect of the present invention, the side surface may be configured of two flank surfaces separated in the thickness direction, and when the flank surface closer to the first plane out of the two flank surfaces is defined as an upper flank surface, in a side view seen in a direction intersecting the thickness direction, a distance from a lower end of the upper flank surface to the tip of the cutting edge portion may be a maximum value at a distance L14 in a cross section passing through a center of the corner edge.

With this configuration, a sufficient thickness at the corner part where the cutting resistance is likely to increase can be ensured.

In the aspect of the present invention, the first inclined surface may have a multi-stage configuration having a plurality of angles.

In the aspect of the present invention, the first plane may have an outer periphery including a linear part and a protruding part that are alternately arranged around an axis of the center line, and in a plan view seen in a direction facing the first plane, when a shortest distance from a boundary between the main cutting edge and the sub-cutting edge that are adjacent to each other in a circumferential direction to the first plane is denoted by L1 and a shortest distance from a boundary between the corner edge and the main cutting edge to the first plane is denoted by L2, a relationship of L1<L2 may be satisfied.

In the aspect of the present invention, when a diameter of an inscribed circle of the rake surface is denoted by D, the D and the L2 may satisfy a relationship of 3.0≤D/L2≤6.5.

In the aspect of the present invention, in a plan view seen in a direction facing the first plane, a width of the first inclined surface may be larger than a width of the second inclined surface.

In the aspect of the present invention, when seen in a direction perpendicular to the first plane, when a straight line connecting an intersection point of extension lines of the main cutting edges that are adjacent to each other and the center line is defined as a first straight line, and a point where the first straight line passes through the corner edge is defined as a first vertex, a shape formed by connecting the first vertices of a plurality of the corner edges may be a regular polygon, when a vertex of the protruding part that is farthest from the attachment hole is defined as a second vertex, a shape formed by connecting a plurality of the second vertices may also be a regular polygon, a phase shift may occur around the center line between the regular polygon formed by connecting the first vertices and the regular polygon formed by connecting the second vertices, and the first straight line and a second straight line that is parallel to the first plane and that connects the second vertex through the center line may intersect at the center line at an angle θ3.

According to another aspect of the present invention, there is provided a tool body that rotates around a tool rotation axis, in which an insert attachment seat to which the above-described cutting insert is attachably and detachably attached is provided on a tip part of the tool body.

With this configuration, since the cutting insert is provided which suppresses the damage to the unused cutting edge portion while ensuring the effect of reducing the cutting resistance via the breaker, it is possible to achieve highly efficient cutting work over the long term.

According to still another aspect of the present invention, there is provided an edge-replaceable rotary cutting tool including: the above-described cutting insert; and the above-described tool body, in which, when the cutting insert is attached to the tool body such that the seating surface of the cutting insert contacts the insert attachment seat of the tool body, a cutting angle of the main cutting edge with respect to a work material is less than 45°.

Advantageous Effects of Invention

According to the present invention, it is possible to provide a cutting insert that is capable of improving chip discharge performance of a cutting insert attached to a rotating tool body and that has an enhanced cutting edge strength, and an edge-replaceable rotary cutting tool including such a cutting insert.

DESCRIPTION OF EMBODIMENTS

Figure 1:
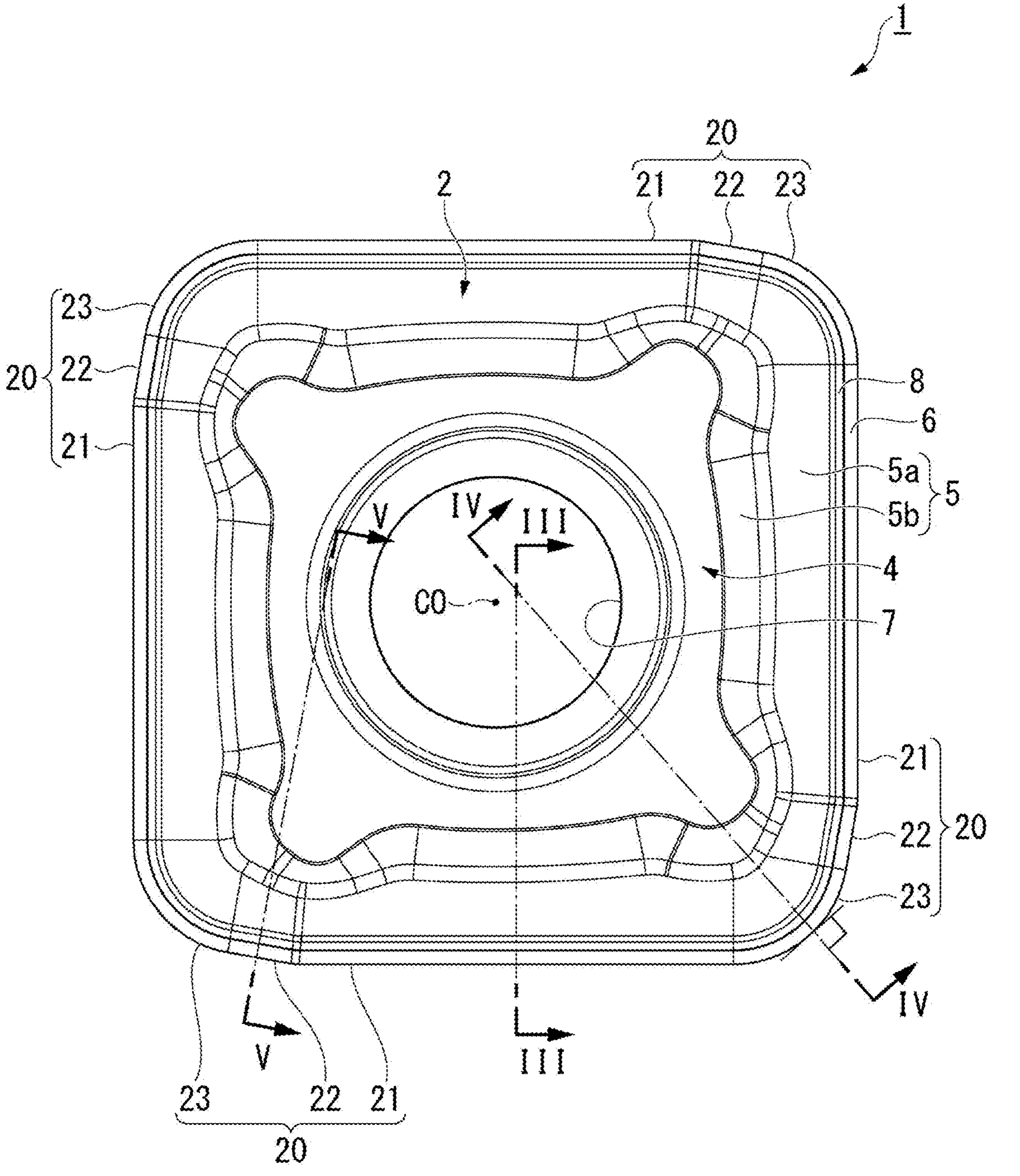
FIG. 1 is a plan view showing one embodiment of a cutting insert 1.

Hereinafter, an embodiment to which the present invention is applied will be described in detail with reference to drawings. In the drawings referenced in the following description, in order to facilitate the understanding of featured portions, featureless portions may be omitted for the sake of convenience.

<Cutting Insert>

Figure 2:
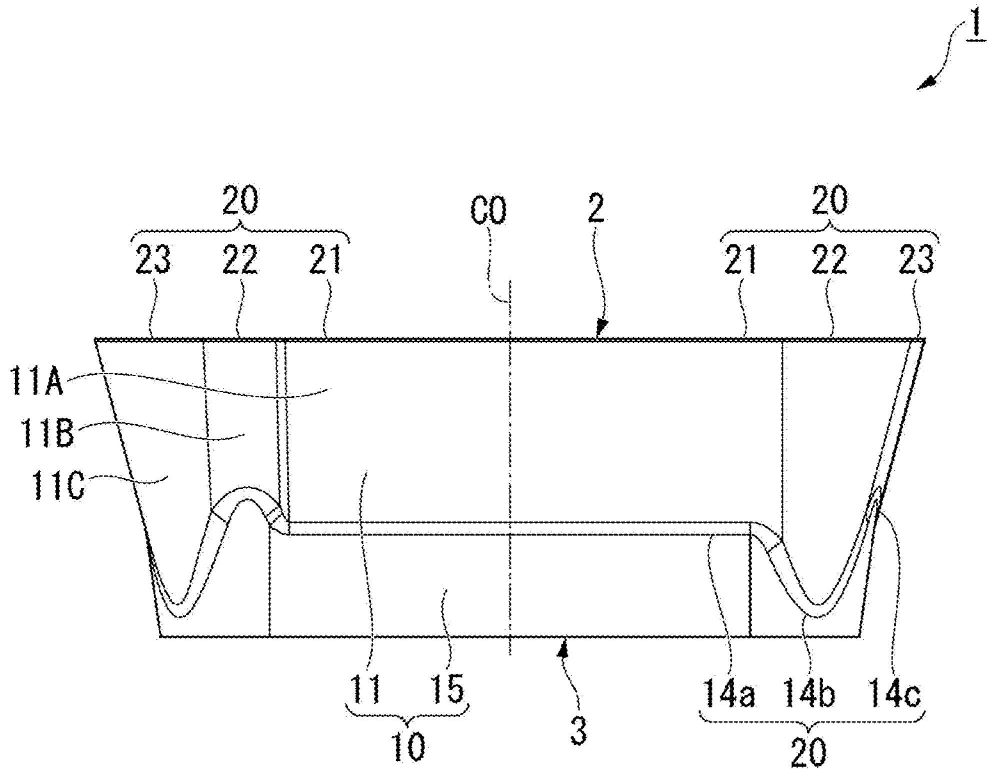
FIG. 2 is a side view showing a configuration of the cutting insert 1 shown in FIG. 1.
Figure 3:
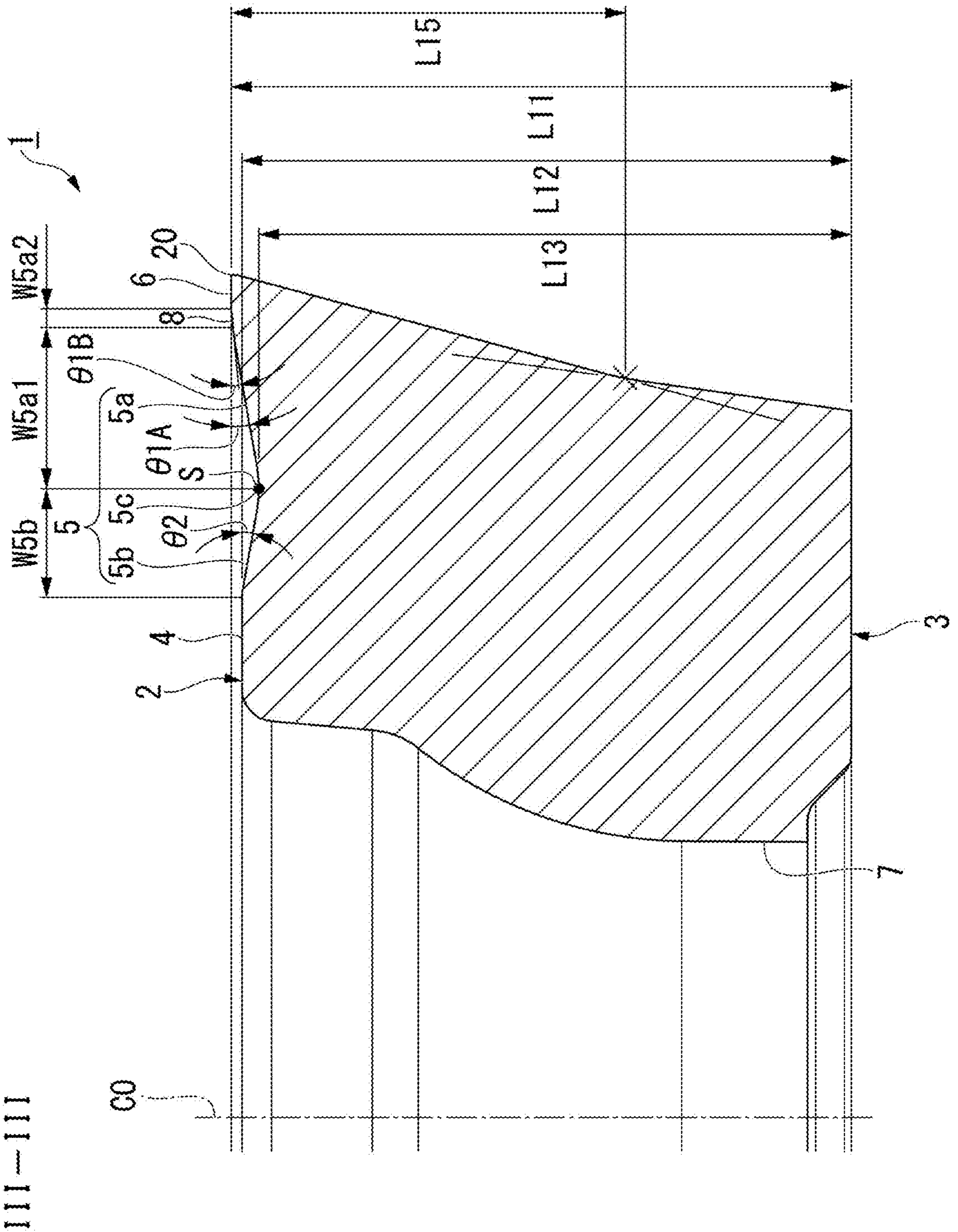
FIG. 3 is a cross-sectional view taken along a line III-III in FIG. 1.
Figure 4:
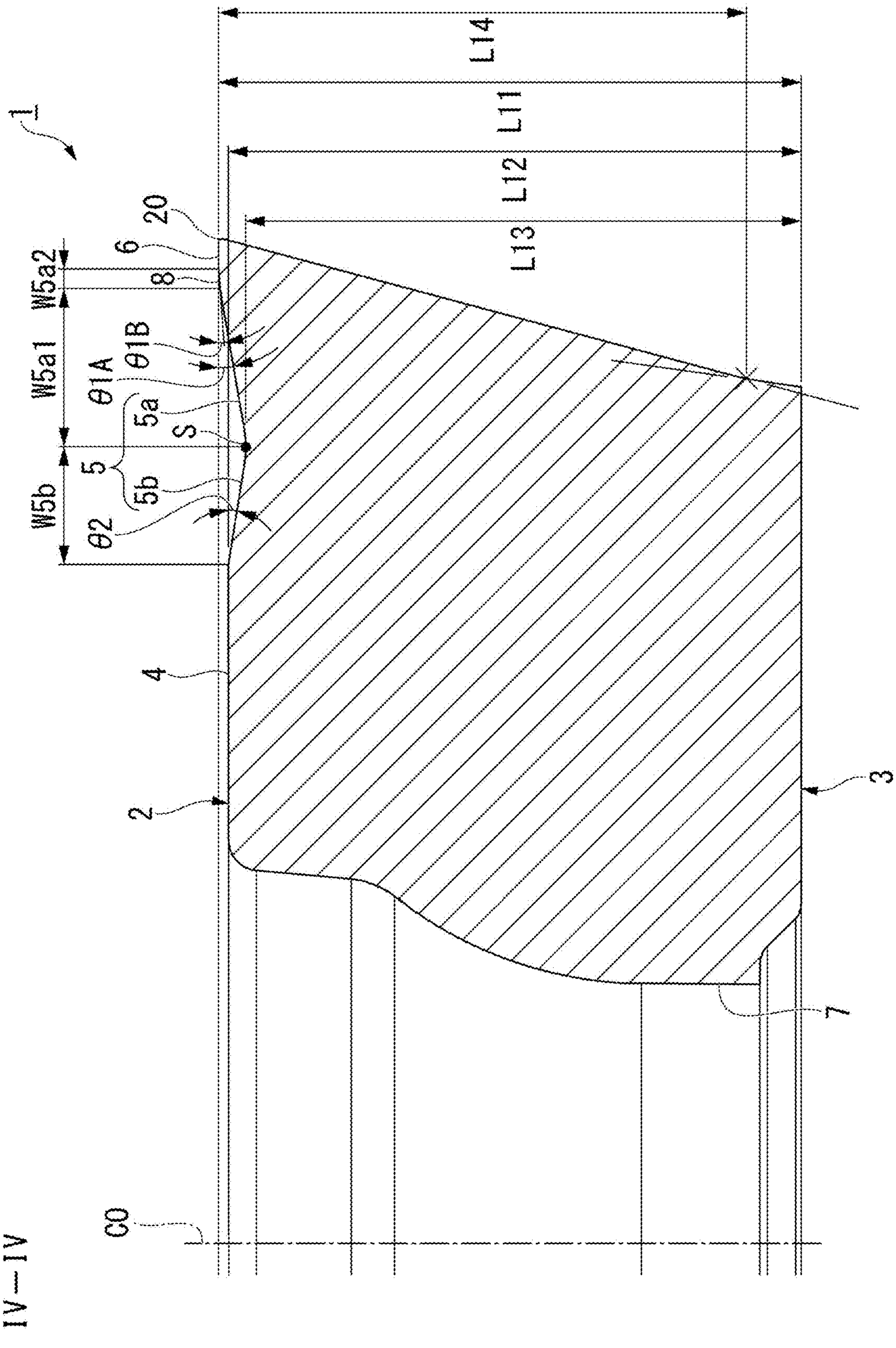
FIG. 4 is a cross-sectional view taken along a line IV-IV shown in FIG. 1.
Figure 5:
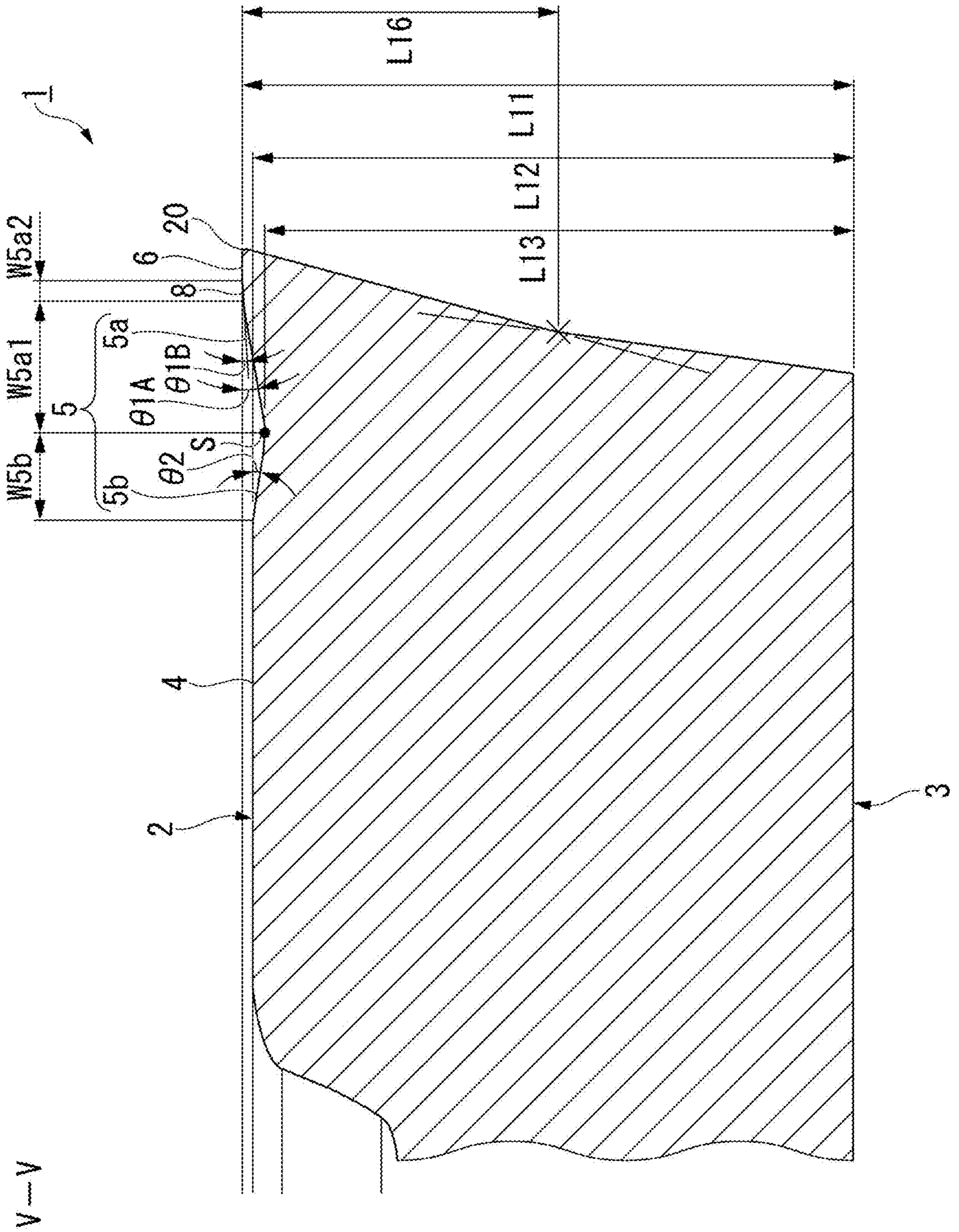
FIG. 5 is a cross-sectional view taken along a line V-V shown in FIG. 1.
Figure 6:
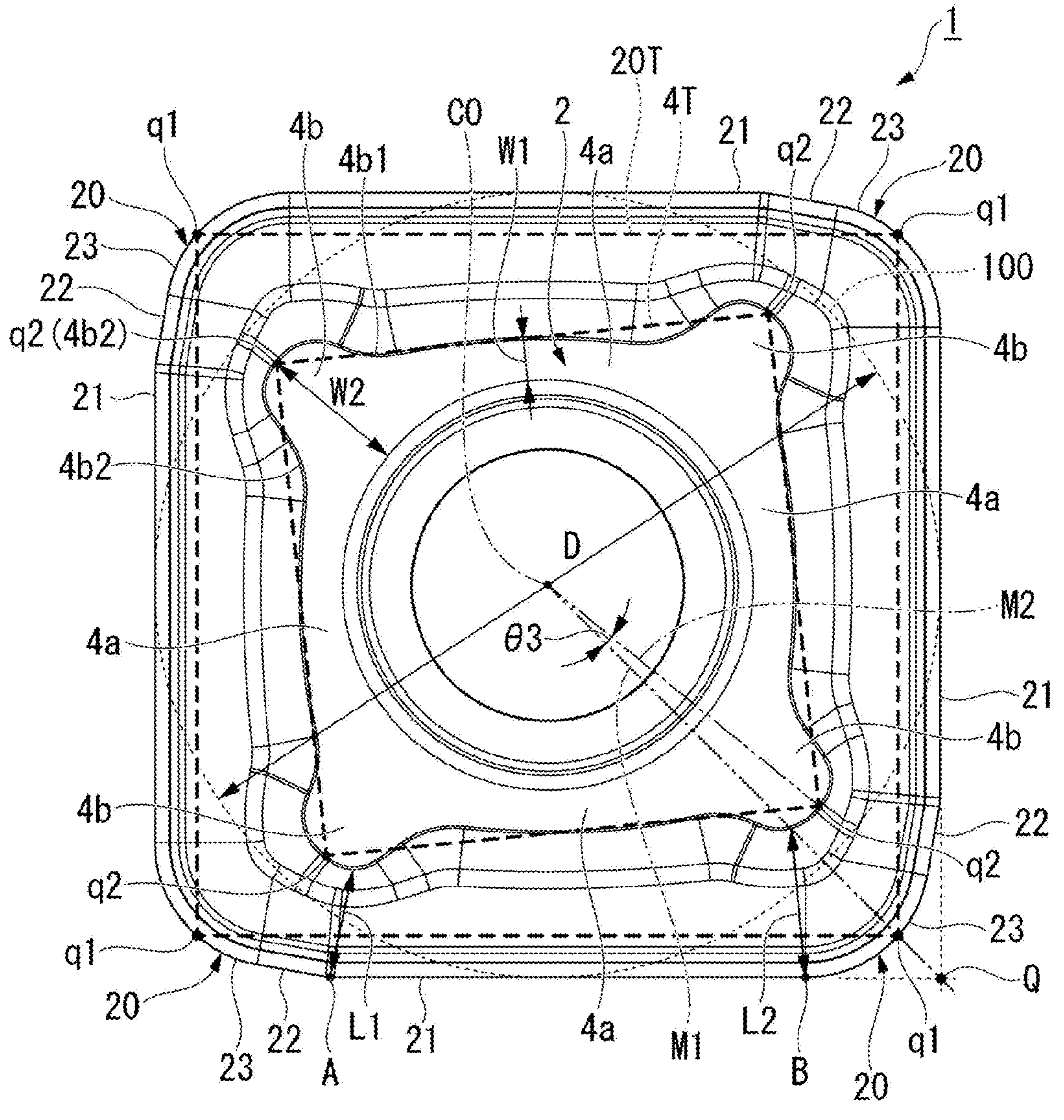
FIG. 6 is a plan view of the cutting insert shown in FIG. 1.
Figure 7:
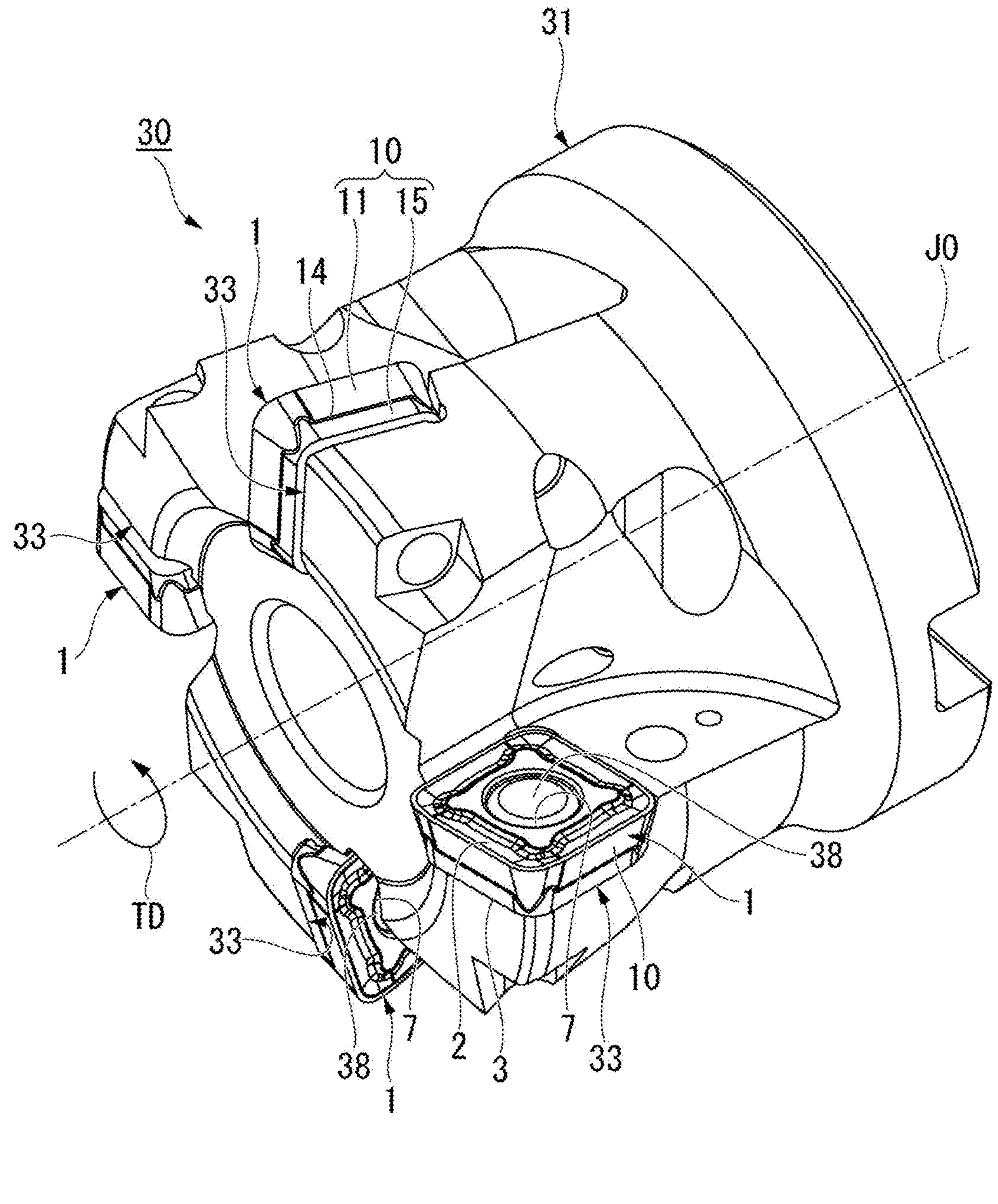
FIG. 7 is a perspective view showing a configuration of an edge-replaceable rotary cutting tool including a plurality of cutting inserts and a tool body.
Figure 8:
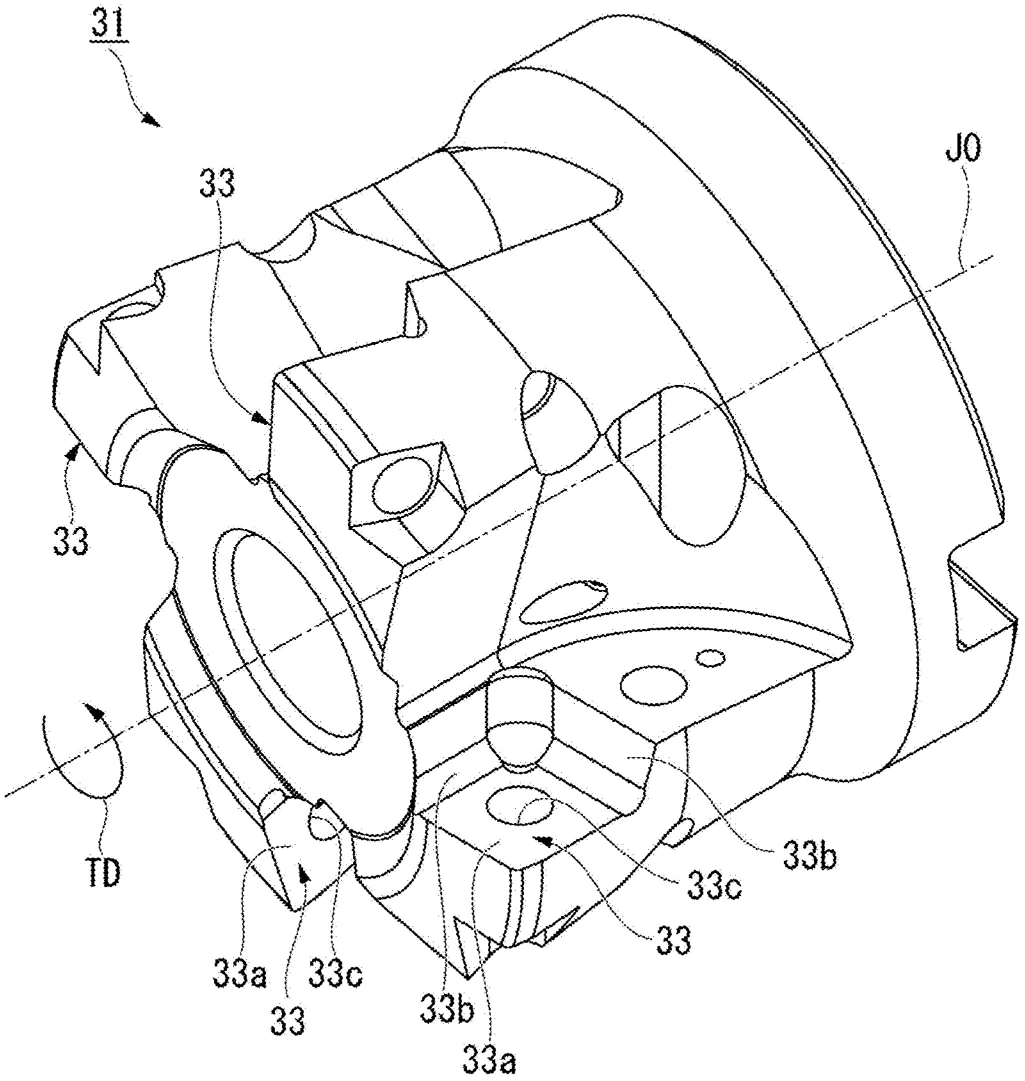
FIG. 8 is a perspective view showing a configuration of the tool body 31 in the edge-replaceable rotary cutting tool 30 shown in FIG. 7.

FIG. 1 is a plan view showing one embodiment of a cutting insert 1. FIG. 2 is a side view showing a configuration of the cutting insert 1 shown in FIG. 1. FIG. 3 is a cross-sectional view taken along a line III-III in FIG. 1. FIG. 4 is a cross-sectional view taken along a line IV-IV shown in FIG. 1. FIG. 5 is a cross-sectional view taken along a line V-V shown in FIG. 1. FIG. 6 is a plan view of the cutting insert 1, and is used for describing various parameters in the following paragraphs. FIG. 7 is a perspective view showing a configuration of an edge-replaceable rotary cutting tool 30 including a plurality of the cutting inserts 1 and a tool body 31. FIG. 8 is a perspective view showing a configuration of the tool body 31 in the edge-replaceable rotary cutting tool 30 shown in FIG. 7.

As shown in FIG. 1, the cutting insert 1 has a polygonal plate shape (a quadrangular plate shape in the present embodiment) that is rotationally symmetrical with respect to a center line CO extending in a thickness direction. In the following description, a direction along the center line CO may be simply referred to as a "thickness direction". In addition, a direction perpendicular to the center line CO may be simply referred to as a "radial direction". Similarly, a circumferential direction around an axis centered on the center line CO may be simply referred to as a "circumferential direction".

As shown in FIGS. 1 and 2, the cutting insert 1 includes a rake surface 2 that constitutes one of a pair of polygonal surfaces, a seating surface 3 that constitutes the other of the pair of polygonal surfaces, a side surface 10 (FIG. 2) that connects the rake surface 2 and the seating surface 3, a plurality of cutting edge portions 20 formed at an intersecting ridge between the rake surface 2 and the side surface 10, and an attachment hole 7 for attaching the cutting insert 1 to the tool body 31.

The cutting insert 1 according to the present embodiment is attachably and detachably attached to a tip part of the tool body 31 shown in FIG. 7 by using a clamp screw (fixing member) 38 as shown in FIG. 7. Therefore, as shown in FIG. 1, the attachment hole 7 through which the clamp screw 38 is inserted is formed at the center of the cutting insert 1. The attachment hole 7 is coaxial with the center line CO and extends along the center line CO, and is open to a first plane 4 and the seating surface 3. That is, the attachment hole 7 penetrates the cutting insert 1 in the thickness direction.

(Seating Surface)

The seating surface 3 is formed in a substantially square shape as seen in a direction along the center line CO. The seating surface 3 is included inside a projection region of the rake surface 2 in the thickness direction.

(Rake Surface)

The rake surface 2 is formed in a substantially square shape as seen in the direction along the center line CO. An outer shape of the rake surface 2 is larger than an outer shape of the seating surface 3.

As shown in FIG. 1, in the present embodiment, the rake surface 2 includes a first plane 4 provided over the entire periphery of the attachment hole 7, and a breaker 5 that is located between the first plane 4 and the cutting edge portion 20 (land 6).

As shown in FIG. 3, the first plane 4 is a plane parallel to the seating surface 3, and is a plane that is recessed more than the cutting edge portion 20 and that is closer to the seating surface 3 than the cutting edge portion 20 in the thickness direction (the direction along the center line CO) of the cutting insert 1. The first plane 4 is not connected to the cutting edge portion 20 (land 6), and the entire outer periphery thereof is spaced away from the cutting edge portion 20 (land 6) toward the center line CO.

As shown in FIG. 1, the breaker 5 is provided over the entire periphery of the first plane 4. The breaker 5 is connected to a land 6 formed on an edge of the cutting edge portion 20.

As shown in FIG. 3, the breaker 5 includes a first inclined surface 5*a* that is inclined toward the seating surface 3 as it extends from the cutting edge portion 20 toward the center line CO, a second inclined surface 5*b* that is inclined in an opposite direction to the seating surface 3 (toward the rake surface 2) as it extends toward the center line CO, and a connecting portion 5*c* that connects the first inclined surface 5*a* and the second inclined surface 5*b*. The second inclined surface 5*b* is formed between the first inclined surface 5*a* and the first plane 4.

The first inclined surface 5*a* of the breaker 5 according to the present embodiment is configured to be connected to four cutting edge portions 20 (lands 6), and is inclined gently toward the seating surface 3 as it extends toward an inside of the rake surface 2 (toward the center line CO), and then is inclined steeply so as to protrude toward the first plane 4 and is connected to an outer peripheral edge of the first plane 4.

The cutting edge portion 20 or a cutting edge length used during cutting varies depending on machining conditions such as a cutting depth, but in the present embodiment, the breaker 5 is formed on the entire circumference of the cutting insert 1, chips are discharged via the breaker 5 regardless of any machining conditions under which the cutting insert 1 is used, so that the cutting resistance can be reduced.

In addition, as shown in FIGS. 1 and 3 to 5, an end part of the first inclined surface 5*a* on the land 6 side has a multi-stage configuration, but this configuration may or may not be provided, and may be configured as a single-stage inclined surface, for example. In a case where the first inclined surface 5*a* includes a multi-stage surface 8 as shown in FIG. 1 and FIGS. 3 to 5, an angle θ1 between the multi-stage surface 8 and the first plane 4 is always set to a small angle on a tip side of the edge. For example, in FIG. 3 in which the multi-stage surface 8 is composed of two stages, an angle θ1B between the multi-stage surface 8 on the edge side and the first plane 4 is 5°, and an angle θ1A between the multi-stage surface 8 on the first plane 4 side and the first plane 4 is 10°.

The angle of θ1 is constant over the entire circumference of the cutting insert 1. The same applies to a case where the first inclined surface 5*a* is composed of the multi-stage surface 8, and for example, in a case where the angle θ1B is 5° and the angle θ1A is 10°, the angle θ1B is 5° and the angle θ1A is 10° in any cross section of the cutting insert 1. That is, the angular relationship of FIG. 3 is also applied to FIGS. 4 and 5.

As shown in FIGS. 3 to 5, in any cross section of the cutting insert 1, a width (a sum of a first width W5*a*1 and a second width W5*a*2) of the first inclined surface 5*a* in the radial direction of the breaker 5 in the present embodiment is preferably larger than the second width W5*b* of the second inclined surface 5*b*. In addition, similarly to the angular relationship described above, the width of the first inclined surface 5*a* is constant over the entire circumference of the cutting insert 1.

As a result, the chips can be guided along the gentle and wide first inclined surface 5*a* after leaving the edge. Therefore, the chips can be discharged while reducing a resistance caused by collision between a breaker surface and the chips. In addition, by narrowing the width of the second inclined surface 5*b* in the radial direction, it is possible to achieve both "ensuring the width of the first inclined surface 5*a* (the sum of the first width W5*a*1 and the second width W5*a*2)" and "ensuring an area of the first plane 4".

The angle θ1 between the first inclined surface 5*a* of the breaker 5 and the first plane 4 and an angle θ2 between the second inclined surface 5*b* and the first plane 4 may be formed to be equal to each other. In addition, in a case where the first inclined surface 5*a* has a multi-stage configuration, the angle (the angle θ1A in FIGS. 3 to 5) between the first inclined surface 5*a* closest to a deepest portion S and the first plane 4 and the angle θ2 may be formed to be equal to each other.

(Cutting Edge Portion)

The intersecting ridge between the rake surface 2 and the side surface 10 is formed by a plurality of cutting edge portions 20 including a plurality of main cutting edges 21, a plurality of sub-cutting edges 22, and a plurality of corner edges 23. As shown in FIG. 1, the cutting edge portion 20 includes a main cutting edge 21, a sub-cutting edge 22 connected to one end side of the main cutting edge 21, and a corner edge 23 connected to an end part of the sub-cutting edge 22 on an opposite side to the main cutting edge 21. The main cutting edge 21, the sub-cutting edge 22, and the corner edge 23 are disposed in this order in a right direction (clockwise direction) in a plan view of the rake surface 2.

In the cutting insert 1 according to the present embodiment, the cutting edge portion 20 composed of the main cutting edge 21, the sub-cutting edge 22, and the corner edge 23 is provided at four positions at intervals of 90° in the circumferential direction about the center line CO. The four cutting edge portions 20 are rotationally symmetrically disposed about the center line CO.

The four cutting edge portions 20 disposed in the circumferential direction are continuous with each other.

The main cutting edge 21 is located at a side part of the rake surface 2 and extends linearly in a plan view of the rake surface 2. The main cutting edge 21 constitutes a major part of the cutting edge portion 20. In a state in which the cutting insert 1 is attached to the tool body 31 (see FIG. 7), the main cutting edge 21 faces a rotation direction TD side of the tool body 31, and faces a work material.

The corner edge 23 is located at a corner part of the rake surface 2. The corner edge 23 has an arc shape in a plan view shown in FIG. 1. Meanwhile, the main cutting edge 21 and the sub-cutting edge 22 extend linearly. Therefore, a boundary between the corner edge 23, and the main cutting edge 21 and the sub-cutting edge 22 is determined by a boundary between the linear shape portion and the arc shape portion in the cutting edge portion 20.

The sub-cutting edge 22 is located between the main cutting edge 21 and the corner edge 23. The sub-cutting edge 22 extends linearly between the main cutting edge 21 and the corner edge 23. The sub-cutting edge 22 extends to be inclined with respect to the extending direction of the main cutting edge 21 so as to approach the center line CO as it extends from the main cutting edge 21 to the corner edge 23. Therefore, the boundary portion between the main cutting edge 21 and the sub-cutting edge 22 has a shape that protrudes slightly outward.

In the present embodiment, the cutting edge portions 20 are subjected to edge treatment for maintaining the strength of the cutting edge portions 20, and the band-shaped land 6 is provided at an edge tip of each of the cutting edge portions 20. A plurality of the lands 6 are continuous with each other and exist on the entire outer periphery of the rake surface 2.

Alternatively, honing may be formed instead of the land 6. In this case, since the breakers 5 are provided on the entire circumference of the cutting insert 1 over the plurality of cutting edge portions 20, it is preferable that the honing is also provided on the plurality of cutting edge portions 20 so that it exists on the entire circumference of the cutting insert 1.

The shape of the honing may be a shape obtained by another honing treatment, such as flat honing, negative honing having a chamfered shape, round honing having a round shape, and flat honing having a horizontal shape. In the present embodiment, it is preferable that the negative honing is formed on the tip of the cutting edge portion 20, and then the R-honing is further formed. This is because by applying both the negative honing and the R-honing, the strength of the tip of the cutting edge portion 20 is improved, and the cutting edge portion 20 is less likely to be damaged when the cutting edge portion 20 bites into the work material, because the cutting edge portion 20 has a larger edge angle at the tip. The amount of honing is appropriately set taking into consideration the desired edge strength, the desired rake surface abrasion amount, the desired cutting resistance, and the like.

(Side Surface)

Since the cutting insert 1 in the present embodiment is a positive type cutting insert, as shown in FIG. 2, an upper flank surface 11 and a lower flank surface 15 constituting the side surface 10 are inclined surfaces substantially along a rake angle. In the present embodiment, when the cutting insert 1 is attached to the tool body 31, a first cutting angle with respect to the work material is less than 45°.

A boundary portion 14 is located between the upper flank surface 11 and the lower flank surface 15. That is, the side surface 10 is composed of two flank surfaces 11 and 15 separated in the thickness direction, and is partitioned into the upper flank surface 11 and the lower flank surface 15 by the boundary portion 14. The upper flank surface 11 and the lower flank surface 15 are adjacent to each other in the direction (thickness direction) along the center line CO of the cutting insert 1.

The upper flank surface 11 is located on the side surface 10 on the rake surface 2 side with respect to the boundary portion 14. In addition, the lower flank surface 15 is located on the side surface 10 on the seating surface 3 side with respect to the boundary portion 14. For a distance from a lower end of the upper flank surface 11 close to the first plane 4 to the tip of the cutting edge portion 20 out of the two flank surfaces 11 and 15, as shown in FIGS. 3 and 4, a distance L14 in a cross section passing through a normal line of the corner edge 23 and a distance L15 in a cross section passing through the main cutting edge 21 satisfy a relationship L14≥L15. In other words, the side surface corresponding to the corner part is disposed by bringing the boundary portion 14 close to the seating surface.

As shown in FIG. 5, a distance L16 in a cross section passing through the sub-cutting edge 22 is shorter than L14 and L15, and as shown in FIG. 2, the boundary portion 14 of the sub-cutting edge 22 has a shape that is convex upward from the main cutting edge 21 side toward the corner edge 23.

The upper flank surface 11 is partitioned into a first region 11A that is connected to the main cutting edge 21, a second region 11B that is connected to the sub-cutting edge 22, and a third region 11C that is connected to the corner edge. The first region 11A, the second region 11B, and the third region 11C are arranged along the circumferential direction of the center line CO.

The boundary portion 14 extends along the circumferential direction of the center line CO on the side surface 10 while being curved in the thickness direction. The boundary portion 14 includes a first section 14*a* that extends along the main cutting edge 21, a second section 14*b* that extends along the sub-cutting edge 22, and a third section 14*c* that extends along the corner edge 23.

On the side surface 10, the first section 14*a* partitions the lower flank surface 15 and the first region 11A of the upper flank surface 11, the second section 14*b* partitions the lower flank surface 15 and the second region 11B, and the third section 14*c* partitions the lower flank surface 15 and the third region 11C. As shown in FIG. 2, the second section 14*b* is located on the rake surface 2 side with respect to the first section 14*a*. In addition, the third section 14*c* is located on the seating surface 3 side with respect to the first section 14*a*.

In the present embodiment, the side surface 10 of the cutting insert 1 is composed of the two flank surfaces 11 and 15 separated in the thickness direction. As a result, a degree of freedom in the edge shape of the cutting edge portion 20 can be increased, and an area of the seating surface 3 can be increased.

The cross-sectional shape shown in FIG. 3 is a cross section passing through a center in a length direction of the main cutting edge 21 of the cutting edge portion 20 in FIG. 1, and is a cross-sectional shape along a line III-III in FIG. 1. In the thickness direction at this position, the distance from the lower end of the upper flank surface 11 to the tip of the cutting edge portion 20 is denoted by L15.

The cross-sectional shape shown in FIG. 4 is a cross section passing through the normal line of the corner edge 23 of the cutting edge portion 20 of FIG. 1, and is a cross-sectional shape along a line IV-IV in FIG. 1. In the thickness direction at this position, the distance from the lower end of the upper flank surface 11 to the tip of the cutting edge portion 20 is denoted by L14.

The cross-sectional shape shown in FIG. 5 is a cross section passing through a center in the length direction of the sub-cutting edge 22, which is a sub-cutting edge, of the cutting edge portion 20 in FIG. 1, and is a cross-sectional shape along a line V-V in FIG. 1. In the thickness direction at this position, the distance from the lower end of the upper flank surface 11 to the tip of the cutting edge portion 20 is denoted by L16.

In the present embodiment, of the cutting edge portion 20, the corner edge 23 is located at a position farthest from the tool rotation axis in a state in which the cutting insert 1 is attached to the tool body 31. Therefore, as shown in FIG. 4, in the cross section passing through the normal line of the corner edge 23, the relationship between the distance L14 from the lower end of the upper-side upper flank surface 11 located on the rake surface 2 side of the side surface 10 in the thickness direction to the edge of the cutting edge portion 20 and the distance L15 in the cross section passing through the main cutting edge 21 is set to L14≥L15, whereby it is possible to ensure a sufficient thickness on the edge side at the corner part. As a result, it is possible to increase the edge strength of the corner part in the cutting insert 1 where the cutting load is likely to increase. Further, the relationship of L14≥L15 is satisfied, whereby it is possible to suppress rubbing between the corner part and the work material caused by a rotation locus approaching a bottom surface side of the corner part during the cutting work.

When the cutting insert 1 is attached to the tool body 31, as shown in FIG. 7, the cutting insert 1 can be attached to the tool body 31 by tightening the clamp screw 38 with respect to the tool body 31. When the clamp screw 38 is tightened, the seating surface 3 of the cutting insert 1 is pressed against an insert attachment seat 33 of the tool body 31, and the upper flank surface 11 located on the rake surface 2 side of the side surface 10 comes into contact with the tool body 31, thereby restraining the cutting insert 1 by the tool body 31.

As a result, the cutting insert 1 is positioned around the axis and in the radial direction in the tool body 31. Of the upper flank surface 11, the first region 11A close to the cutting edge portion 20 is restrained by the tool body 31, so that it is possible to sufficiently firmly restrain the cutting insert 1 against a cutting force applied to the cutting edge portion 20.

The cutting insert 1 according to the present embodiment is an insert having a four-cornered shape. When the cutting edge portions 20 disposed rotationally symmetrically reach a predetermined abrasion amount, the cutting insert 1 is rotated by 90° around the center line CO and reattached to the tool body 31 so that the other cutting edge portion 20 faces the work material.

Next, a shape of the cutting insert 1 on the rake surface 2 side in the present embodiment will be described in detail.

As shown in FIG. 1, in the rake surface 2 according to the present embodiment, the first plane 4 parallel to the seating surface 3 exists over the entire periphery of the attachment hole 7. As shown in FIGS. 3, 4, and 5, the first plane 4 is closer to the seating surface 3 than the cutting edge portion 20, and is recessed inwardly with respect to the cutting edge portion 20.

The first plane 4 has an outer periphery composed of linear parts 4*a* and protruding parts 4*b* that are alternately arranged around the axis of the center line CO. The linear parts 4*a* and the protruding parts 4*b* constituting the outer periphery of the first plane 4 are provided in four units at intervals of 90° in the circumferential direction about the center line CO. The four linear parts 4*a* have the same shape as one another, and the four protruding parts 4*b* also have the same shape as one another.

The linear parts 4*a* and the protruding parts 4*b* are alternately disposed in the circumferential direction and are continuous with each other. In the radial direction intersecting the center line CO, the linear part 4*a* faces the main cutting edge 21, and the protruding part 4*b* faces the sub-cutting edge 22 and the corner edge 23.

As shown in FIG. 6, as seen in an axial direction perpendicular to the first plane 4, the linear part 4*a* has a linear shape as a whole, but has a shape in which a central portion in a length direction is slightly curved outward (toward the main cutting edge 21).

The protruding part 4*b* is a portion that has an arc shape centered on one or a plurality of imaginary center points located on the attachment hole 7 side and that protrudes radially outward with respect to the linear part 4*a* toward the sub-cutting edge 22 and the corner edge 23.

In addition, the protruding part 4*b* has a pair of connection end parts 4*b*1 connected to a pair of the linear parts 4*a* adjacent to each other on both sides in the circumferential direction. The pair of connection end parts 4*b*1 is a portion that has an arc shape centered on one or a plurality of imaginary center points located on the main cutting edge 21 side and that is slightly recessed inward with respect to the linear part 4*a* toward the attachment hole 7.

In the present embodiment, the protruding part 4*b* may have an arc shape composed of a plurality of curvatures, or may have an arc shape composed of one curvature. In addition, the protruding part 4*b* may have an arc shape partially mixed with a short straight line. In the present embodiment, for example, a linear part 4*b*2 exists at a vertex (vertex q2 described below) of the protruding part 4*b*.

In the radial direction of the attachment hole 7, a maximum width W2 between the attachment hole 7 and the protruding part 4*b* (vertex q2) is larger than a maximum width W1 between the attachment hole 7 and the linear part 4*a* facing the main cutting edge 21, and a relationship W1<W2 is satisfied.

In a case where the width W1 on the linear part 4*a* side of the first plane 4 facing the main cutting edge 21 is increased, there is a concern that a major part of the chips generated by the main cutting edge 21 when cutting the work material comes into contact with the linear part 4*a*, so that it is preferable that the linear part 4*a* is away from the main cutting edge 21.

As shown by a broken line in FIG. 6, a shape formed by connecting intersection points (intersection points Q) of extension lines of the main cutting edges 21 adjacent to each other is a regular polygon 20T. In addition, a shape formed by connecting the vertices q2 of the four protruding parts 4*b* of the first plane 4 is a regular polygon 4T smaller than the outer shape of the rake surface 2. In the present embodiment, a "phase shift" is provided between the outer shape of the rake surface 2 and the outer shape of the first plane 4 around the center line CO.

Here, the term "phase shift" refers to an amount of shift around the axis between the two regular polygons 20T and 4T shown in FIG. 6. Specifically, as seen in the direction perpendicular to the first plane 4, when a straight line connecting the intersection point Q of the extension lines of the adjacent main cutting edges 21 and the center line CO is defined as a first straight line M1, and a straight line connecting the vertex q2 and the center line CO is defined as a second straight line M2, an angle θ3 between the first straight line M1 and the second straight line M2 is the amount of shift around the axis. When a point where the first straight line M1 passes through the corner edge 23 is defined as a vertex q1, a shape formed by connecting the vertices q1 of the plurality of corner edges 23 is a regular polygon 20T.

In addition, when a vertex of the protruding part 4*b* on the first plane 4 that is farthest from the attachment hole 7 is defined as a vertex q2, a shape formed by connecting all the vertices q2 is a regular polygon 4T. That is, all the protruding parts 4*b* are formed to have the same shape.

A phase shift occurs around the center line CO between the regular polygon 20T formed by connecting all the vertices q1 and the regular polygon 4T formed by connecting all the vertices q2, and the first straight line M1 and the second straight line M2 intersect at the center line CO at the angle θ3.

The angle θ3, which is the amount of shift, is preferably within a range of $3° < θ3 < 15°$, and more preferably within a range of $5° < θ3 < 10°$.

Therefore, the vertex q1 of the corner edge 23 on the rake surface 2 (cutting edge portion 20) side and the vertex q2 of the protruding part 4*b* of the first plane 4 do not face each other in the radial direction of the attachment hole 7. As described above, since there is a phase shift between the rake surface 2 and the first plane 4 around the center line CO, the distance between the first plane 4 and the cutting edge portion 20 is not constant, and positions where the first plane 4 and the cutting edge portion 20 are closest to each other and positions where the first plane 4 and the cutting edge portion 20 are farthest from each other exist in the circumferential direction.

As shown in FIG. 6, in the direction perpendicular to the center line CO, when a shortest distance from a boundary A between the main cutting edge 21 and the sub-cutting edge 22 that are adjacent to each other in the circumferential direction to the first plane 4 is denoted by L1, and a shortest distance from a boundary B between the main cutting edge 21 and the corner edge 23 to the first plane 4 is denoted by L2, a relationship of L1<L2 is satisfied.

In addition, in the present embodiment, as shown in FIG. 6, when a diameter of an inscribed circle 100 of the rake surface 2 is denoted by D, it is preferable that the diameter D and the shortest distance L2 satisfy a relationship of $3.0 \leq D/L2 \leq 6.5$.

In order to obtain the preferred shape of the chips and the effect of reducing the cutting resistance during the cutting work, a constant breaker distance is required, and it is necessary to ensure the length of the shortest distance L2 in the vicinity of the corner edge 23 where the chips become large, but in a case where D/L2 is larger than 6.5, the length of the shortest distance L2 is not sufficient with respect to the size of the cutting insert 1, so that it is difficult to obtain an appropriate breaker effect.

On the other hand, in a case where D/L2 is less than 3.0, the area of the first plane 4 around the attachment hole 7 is too small, so that the edge strength of the cutting edge portion 20 decreases.

In addition, in a state in which the cutting insert 1 is attached to the tool body 31, the corner part is located on the most outer peripheral side regardless of the presence or absence of the breaker 5. In addition, in a case of a shape having the breaker 5 on the rake surface 2 side, it is easily affected by a reduction in thickness. That is, the cutting load at the corner part is likely to increase during the cutting work. With respect to this, in the rake surface 2 in the present embodiment, the width of the breaker 5 at the corner part is partially narrowed by providing the protruding part 4*b* to project toward the cutting edge portion 20 in the vicinity of the corner part in the first plane 4, so that a sufficient thickness of the cutting insert 1 at the corner part can be ensured while ensuring the width of the breaker required to obtain the preferred chip shape and the effect of reducing the cutting resistance. As a result, it is possible to reduce the influence of the reduction in thickness by the breaker 5 while ensuring the discharge performance of the chips and the effect of reducing the cutting resistance by the breaker 5.

Similarly, the sub-cutting edge 22 includes a tool lowest point that first comes into contact with the work material during the cutting work, so that the sub-cutting edge 22 receives a large impact from the work material. However, in the rake surface 2 in the present embodiment, in the first plane 4, the first plane 4 in the vicinity of the sub-cutting edge 22 is formed such that the width of the breaker 5 is partially narrowed. As a result, the edge strength of the sub-cutting edge 22 is ensured, and a shape having impact resistance is obtained.

On the other hand, since a thickness of the chips generated by the sub-cutting edge 22 is thinner than a thickness of the chips generated by the main cutting edge 21 and the corner edge 23, the shortest distance L1 can be made shorter than the shortest distance L2.

Next, the shape of the breaker 5 of the cutting insert 1 according to the present embodiment will be described in detail.

As shown in FIGS. 3, 4, and 5, the breaker 5 according to the present embodiment is composed of the first inclined surface 5*a*, the second inclined surface 5*b*, and the connecting portion 5*c* that connects the first inclined surface 5*a* and the second inclined surface 5*b*.

As shown in FIG. 3, the connecting portion 5*c* of the breaker 5 has a shape in which the first inclined surface 5*a* and the second inclined surface 5*b* are connected by an arc, but the connecting portion 5*c* is not limited to the arc shape as long as it smoothly connects the first inclined surface 5*a* and the second inclined surface 5*b*. For example, the shape may be linear. Here, of the connecting portion 5*c*, a point closest to the seating surface 3 is defined as a "deepest portion S".

As shown in FIG. 3, in the thickness direction of the cutting insert 1, a distance from the seating surface 3 to the tip of the cutting edge portion 20 is denoted by L11. Here, the tip of the cutting edge portion 20 refers to a portion of the cutting edge portion 20 that is farthest from the seating surface 3. Therefore, in a case where the negative honing is formed on the tip of the cutting edge portion 20, a distance from a corner farthest from the seating surface 3 to the seating surface 3 among two corners formed by the negative honing is L11. Similarly, in a case where the R-honing is performed on the tip of the cutting edge portion 20, a distance from a vertex of the R-honing, that is, a point on an R arc shape that is farthest from the seating surface 3 to the seating surface 3 is L11.

In the thickness direction of the cutting insert 1, a distance from the seating surface 3 to the first plane 4 is denoted by L12. The first plane 4 is formed as a plane perpendicular to the center line CO around the attachment hole 7. Since the first plane 4 is parallel to the seating surface 3, the distance L12 to the seating surface 3 is equal at any point on the first plane 4.

In the thickness direction of the cutting insert 1, a distance from the seating surface 3 to the deepest portion S of the breaker 5 is denoted by L13. The two inclined surfaces (the first inclined surface 5*a* and the second inclined surface 5*b*) constituting the breaker 5 are connected by the connecting portion 5*c*. The deepest portion S of the breaker 5 indicates the lowest point of the connecting portion 5*c*. Therefore, in a case where the connecting portion 5*c* is arc-shaped, a distance from the deepest portion S (lowest point) of the connecting portion 5*c* to the seating surface 3 is L13. Similarly, in a case where the connecting portion 5*c* is linear and parallel to the seating surface 3, a distance between the connecting portion 5*c* and the seating surface 3 is L13, and the distance L13 to the seating surface 3 is equal at any point on the connecting portion 5*c*. In addition, in a case where the connecting portion 5*c* is composed of an inclined surface, one of a connection side of the connecting portion 5*c* with the first inclined surface 5*a* or a connection side of the connecting portion 5*c* with the second inclined surface 5*b* is closer to the seating surface 3 than the other side, so that a distance from either end of the connecting portion 5*c* in the length direction to the seating surface 3 is L13.

In the cutting insert 1, in the thickness direction along the center line CO, the distance L11 from the seating surface 3 to the tip of the cutting edge portion 20, the distance L12 from the seating surface 3 to the first plane 4, and the distance L13 from the seating surface 3 to the deepest portion S of the breaker 5 satisfy a relationship of L11>L12>L13.

As shown in FIG. 5, a difference between the distance L11 from the seating surface 3 to the tip of the cutting edge portion 20 and the distance L12 from the seating surface 3 to the first plane 4 is within a range of 0.01 mm or more and less than 0.15 mm.

In a case of the configuration in which the breaker 5 is provided over the entire circumference of the cutting insert 1 on the rake surface 2 side, the effect of reducing cutting resistance can be obtained regardless of which cutting edge portion 20 is used, but at the same time, there is a concern that the thickness of the cutting insert 1 is reduced and thus the strength is reduced. With respect to this, in the present embodiment, the difference between the distance L11 and the distance L12 is set to be within a range of 0.01 mm or more and 0.15 mm or less, whereby it is possible to increase the cross sectional area of the cutting insert 1 even in a configuration in which the breaker 5 is provided. Therefore, it is possible to ensure the strength of the cutting insert 1 with the increase in thickness while ensuring the discharge performance of the chips by the breaker 5. As a result, even in a case where severe cutting conditions are used, particularly in high-efficiency machining, the cutting resistance can be reduced, so that highly efficient cutting work can be performed.

In addition, a difference between the distance L11 from the seating surface 3 to the tip of the cutting edge portion 20 and the distance L13 from the seating surface 3 to the deepest portion S of the breaker 5 is within a range of 0.15 mm or more and 0.25 mm or less.

In a case where the difference between the distance L11 and the distance L13 is 0.25 mm or more, the adverse effect due to the insufficient strength of the cutting insert 1 is greater than the effect of reducing the cutting resistance, resulting in bending, breakage, or the like in a root portion of the chips. Therefore, the difference between the distance L11 and the distance L13 is set to be within the above-described range, whereby it is possible to sufficiently ensure the effect of the cutting resistance, the discharge performance of the chips, and the retention of the strength of the cutting insert 1.

(Configuration of Edge-Replaceable Rotary Cutting Tool)

FIG. 7 is a perspective view showing a configuration of the edge-replaceable rotary cutting tool 30 including a plurality of the cutting inserts 1 and the tool body 31 to which the cutting inserts 1 are attachably and detachably attached.

FIG. 8 is a perspective view showing a configuration of the tool body 31 in the edge-replaceable rotary cutting tool 30 shown in FIG. 7.

As shown in FIGS. 7 and 8, the edge-replaceable rotary cutting tool 30 performs milling by rotating the tool body 31 in the rotation direction TD about a tool rotation axis JO. As shown in FIG. 7, the edge-replaceable rotary cutting tool 30 includes the tool body 31 that rotates around the tool rotation axis JO, and five cutting inserts 1 attached to the tool body 31.

As shown in FIGS. 7 and 8, four insert attachment seats 33 are provided on the tip part of the tool body 31. The number of the insert attachment seats 33 is increased or decreased depending on a tool diameter of the edge-replaceable rotary cutting tool. Therefore, in a case where the tool diameter is small, the number of the insert attachment seats 33 is decreased, and in a case where the tool diameter is large, the number of the insert attachment seats 33 is increased. The insert attachment seat 33 includes an attachment seat bottom surface 33*a* and a pair of attachment seat wall surfaces 33*b*.

As shown in FIG. 8, the attachment seat bottom surface 33*a* has a square shape having an area substantially equal to an area of the seating surface 3 of the cutting insert 1, and faces the rotation direction TD, The pair of attachment seat wall surfaces 33*b* extends from two sides of the attachment seat bottom surface 33*a* to the rotation direction TD side. A screw hole 33*c* is formed substantially at the center of the attachment seat bottom surface 33*a*.

As shown in FIG. 7, the attachment seat bottom surface 33*a* faces and comes into contact with the seating surface 3 of the cutting insert 1. In addition, the attachment seat wall surfaces 33*b* face and come into contact with the side surfaces 10 formed on four sides of the cutting insert 1. That is, the attachment seat bottom surface 33*a* and the attachment seat wall surfaces 33*b* in the insert attachment seat 33 come into contact with the seating surface 3 and the upper flank surface 11 of the cutting insert 1.

The cutting insert 1 is attached to the insert attachment seat 33 of the tool body 31 by using the clamp screw 38 shown in FIG. 7. Specifically, the cutting insert 1 is attached to the tool body 31 by tightening the clamp screw 38 inserted into the attachment hole 7 into the screw hole 33*c* formed at the center of the attachment seat bottom surface 33*a*.

The cutting insert 1 according to the present embodiment is seated with the seating surface 3 in close contact with the attachment seat bottom surface 33*a* of the tool body 31 and with two circumferentially adjacent upper flank surfaces 11 abutting on the attachment seat wall surface 33*b*. Further, by inserting the clamp screw 38 shown in FIG. 7 into the screw hole 33*c* shown in FIG. 8, the seating surface 3 is pressed against the attachment seat bottom surface 33*a*, and the upper flank surface 11 (first region 11A) is pressed against the attachment seat wall surface 33*b*.

The cutting insert 1 according to the present embodiment has a shape that ensures a sufficient thickness at the corner part, so that it is possible to increase the strength of the cutting insert 1 itself attached to the rotating tool body 31. That is, the protruding part 4*b* that projects toward the corner part is provided on the first plane 4 constituting the rake surface 2, whereby it is possible to reduce the influence of the reduction in thickness due to the breaker 5. In addition, in the cross section passing through the normal line of the corner edge 23, the distance L14 from the lower end of the upper flank surface 11 located on the rake surface 2 side of the side surface 10 in the thickness direction to the tip of the cutting edge portion 20 is maximized, and the lower end of the upper flank surface 11 is brought closer to the seating surface 3, whereby it is possible to ensure a sufficient thickness at the corner part.

As a result, it is possible to achieve both the effect of reducing the cutting resistance at the corner part of the cutting insert 1 where the cutting load is likely to increase and the effect of retaining the strength.

Further, since the breaker 5, which is located at a position lower than the cutting edge portion 20 (on the seating surface 3 side), is formed on the entire circumference of the cutting insert 1, the chips are discharged via the breaker 5 regardless of the machining conditions under which the cutting insert 1 is used. Therefore, it is possible to suppress the damage to the cutting edge portion 20 due to the contact of the chips with the unused cutting edge portion 20. In addition, since the discharge performance of the chips is good, it is possible to suppress the increase in cutting resistance caused by the chip clogging or the chip deformation.

Further, in the cutting insert 1 including the breaker 5, it is possible to suppress the chip clogging not only in face milling but also in shape machining where a machined surface has a complicated shape, thereby realizing high-efficiency machining.

In addition, the cutting insert 1 according to the present embodiment has a shape in which the first plane 4 and the breaker 5 exist on the rake surface 2, and has a configuration in which the “phase shift” occurs between the rake surface 2 and the first plane 4 by the shift amount of the angle θ3 around the center line CO. As a result, it is possible to ensure the thickness of the cutting insert 1 in the vicinity of the corner edge 23, resulting in a shape that can achieve both the effect of the breaker shape on the chips and the effect of improving the strength of the cutting insert 1.

Further, the breaker 5 allows the chips to be suitably curled before being discharged, so that it is possible to prevent the occurrence of biting-in of the chips between the cutting insert 1 and the work material. As a result, it is possible to improve the discharge performance of the chips during the cutting work and to reduce the cutting resistance.

With the cutting insert 1 according to the present embodiment, even when machining a difficult-to-cut material, the discharge performance of the chips is high, so that the cutting width or the cutting depth can be set large. As a result, it is possible to prevent the chips from colliding with the cutting insert even under the machining conditions in which high machining efficiency is achieved, and it is possible to sufficiently exhibit the original performance of the cutting insert 1.

EXAMPLES

Next, the results of the cutting work performed to confirm the effect of the present invention will be described.

Using a cutting tool using the cutting insert of Example, the cutting work was performed on a work material under the machining conditions described in the following paragraph and Table 1, and a chip shape and a spindle load in a spindle of a machine tool were compared.

As the work material, a work material made of a steel material of S50C(H) was used, which had a shape including a flat portion and a standing wall portion connected to the flat portion.

In order to compare the performance of the cutting insert of Example with the performance of the cutting insert of Comparative Example, an axial direction cutting depth ap was set to 2.0 mm in [Test 1], the axial direction cutting depth ap was set to 2.5 mm in [Test 2], and the axial direction cutting depth ap was set to 3.0 mm in [Test 3]. In addition, all the other conditions were the same in both Example and Comparative Example.

The cutting conditions which were the same for Example and Comparative Example are shown below.

Rotation speed $n=758\ min^{-1}$

Cutting speed Vc=150 m/min

Feeding speed Vf=1516

Feeding amount per edge fz=2.0 mm/t

Radial cutting width ae=38 mm

Protrusion amount OH=200 mm (tool diameter Do with respect to protrusion amount OH: OH/Do=3.2)

No coolant

Other than the above, the tool diameter/shape of the tool body, the number of the inserts, and the type of the machine tool are all the same in both Example and Comparative Example. Under such machining conditions, the cutting work was performed.

The cutting insert of Example is a cutting insert in which, in the thickness direction along the center line CO, the distance L11 from the seating surface 3 to the tip of the cutting edge portion 20, the distance L12 from the seating surface 3 to the first plane 4, and the distance L13 from the seating surface 3 to the deepest portion S of the breaker 5 satisfy the relationship of L11>L12>L13.

The cutting insert of Comparative Example is a cutting insert in which the distances L11, L12, and L13 in the thickness direction along the center line CO satisfy the relationship of L12>L11>L13.

The other shapes were the same as those in Example.

Table 1 shows results (spindle load value of the machine tool spindle) of Test 1, Test 2, and Test 3 performed using Example and Comparative Example.

Figure 9A:
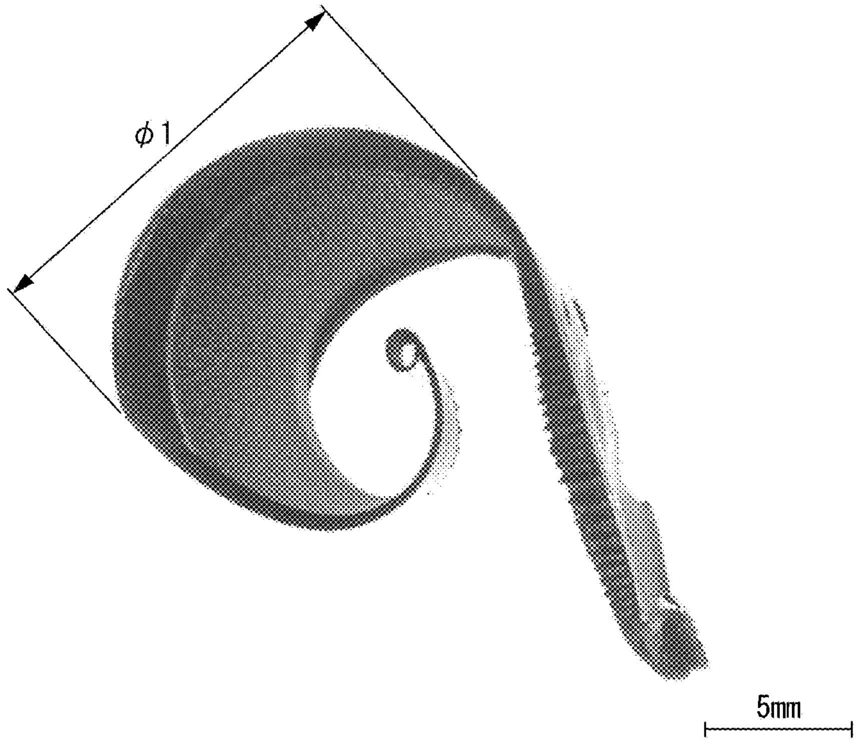
FIG. 9A is a photograph showing a chip generated in Example in Test 1 (axial direction cutting depth ap=2.0 mm).
Figure 9B:
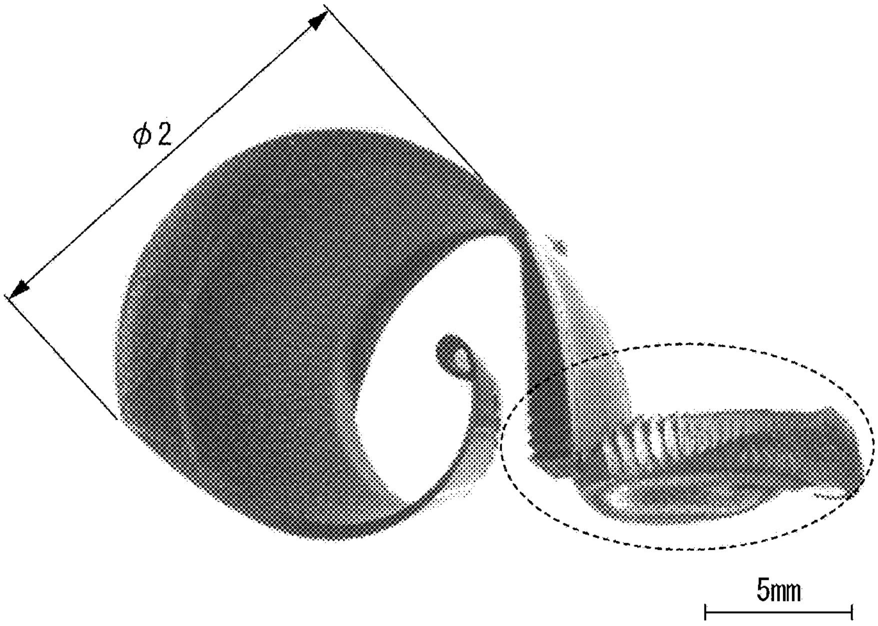
FIG. 9B is a photograph showing a chip generated in Comparative Examples in Test 1 (axial direction cutting depth ap=2.0 mm).

FIG. 9A is a photograph showing a chip generated in this example in Test 1 (axial direction cutting depth ap=2.0 mm). FIG. 9B is a photograph showing a chip generated in Comparative Example in Test 1 (axial direction cutting depth ap=2.0 mm).

Figure 10A:
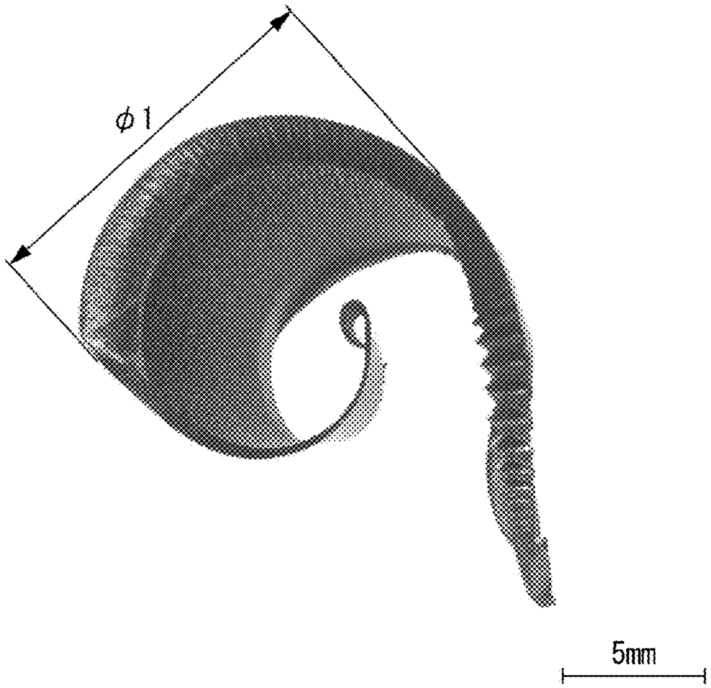
FIG. 10A is a photograph showing a chip generated in Example in Test 2 (axial direction cutting depth ap=2.5 mm).
Figure 10B:
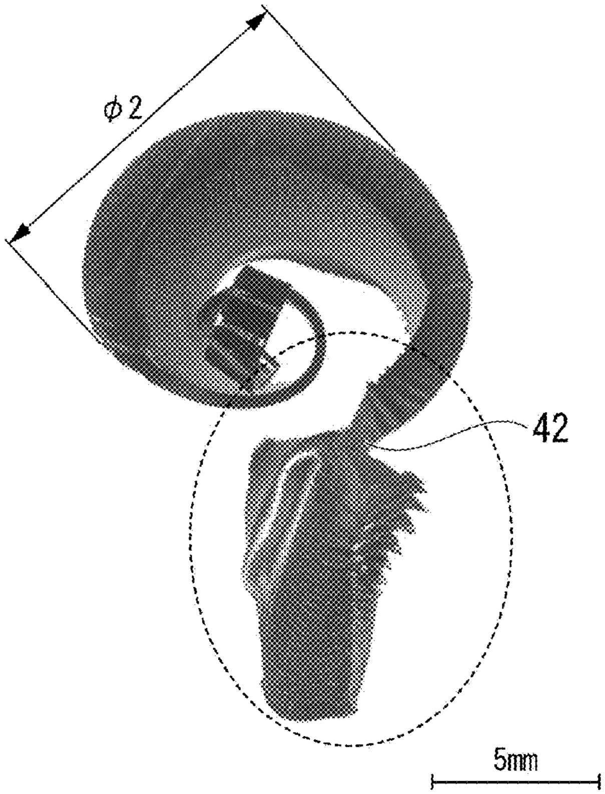
FIG. 10B is a photograph showing a chip generated in Comparative Examples in Test 2 (axial direction cutting depth ap=2.5 mm).

FIG. 10A is a photograph showing a chip generated in this example in Test 2 (axial direction cutting depth ap=2.5 mm). FIG. 10B is a photograph showing a chip generated in Comparative Examples in Test 2 (axial direction cutting depth ap=2.5 mm).

Figure 11A:
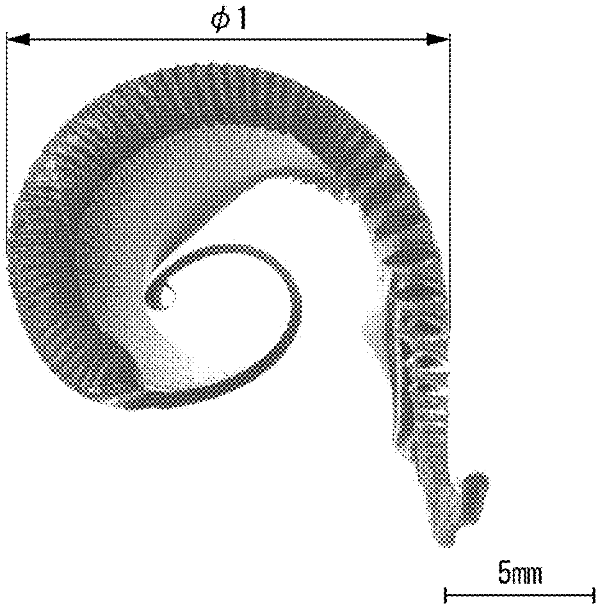
FIG. 11A is a photograph showing a chip generated in Example in Test 3 (axial direction cutting depth ap=3.0 mm).
Figure 11B:
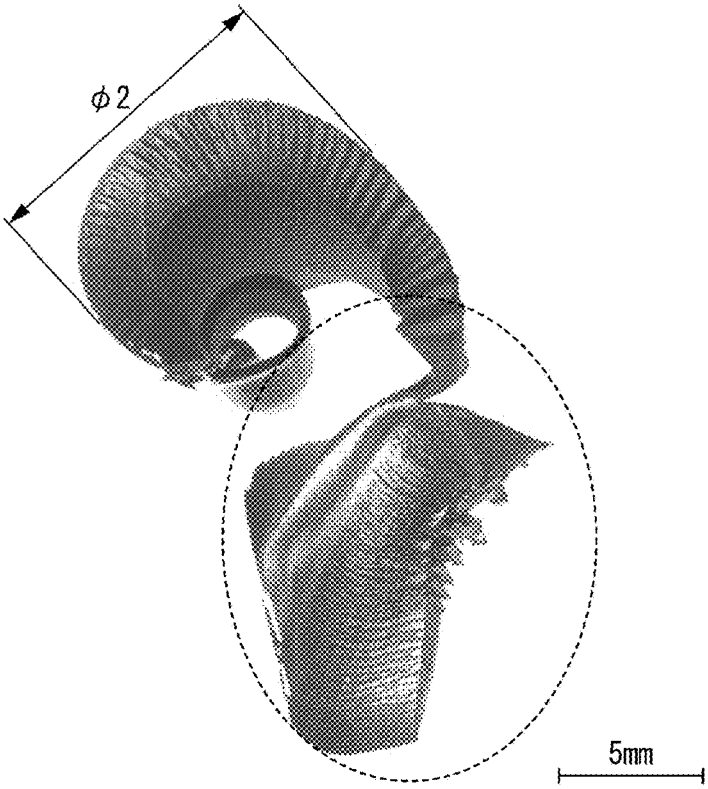
FIG. 11B is a photograph showing a chip generated in Comparative Examples in Test 3 (axial direction cutting depth ap=3.0 mm).

FIG. 11A is a photograph showing a chip generated in this example in Test 3 (axial direction cutting depth ap=3.0 mm). FIG. 11B is a photograph showing a chip generated in Comparative Examples in Test 3 (axial direction cutting depth ap=3.0 mm).

TABLE 1

| | | Spindle load value of machine tool spindle | Chip curl diameter | Bending of chip | Chip discharge performance |
|---|---|---|---|---|---|
| Test 1 | Example | 32% | φ 14.4 mm | Absent | Good |
| | Comparative Example | 32% | φ 14.8 mm | Present | Bad |
| Test 2 | Example | 44% | φ 13.3 mm | Absent | Good |
| | Comparative Example | 45% | φ 10.4 mm | Present | Bad |
| Test 3 | Example | 44% | φ 15.0 mm | Absent | Good |
| | Comparative Example | 45% | φ 11.0 mm | Present | Bad |

From the spindle load values of the machine tool spindle shown in Table 1, in any of the cutting tests of Test 1 to Test 3, the spindle load value of the machine tool spindle in Examples was approximately equal to the spindle additional value of the machine tool spindle in Comparative Examples. That is, in the cutting insert 1, it is considered that the positional relationship between the first plane 4, the tip of the cutting edge portion 20, and the deepest portion S of the breaker 5 has no effect on the cutting resistance. The spindle load value was measured by a load logger manufactured by a machine tool manufacturer (machine tool manufacturer: OKK Corporation) which is used for cutting.

In addition, from the test results, in Test 1, a curl diameter φ1 of the chips generated in Example was 14.4 mm, and a curl diameter φ2 of the chips generated in Comparative Example was 14.8 mm, which were substantially the same.

In addition, in Test 2, the curl diameter φ1 of the chips generated in Example was 13.3 mm, and the curl diameter φ2 of the chips generated in Comparative Example was 10.4 mm, meaning that the chips of Example were larger than the chips of Comparative Example.

Further, in Test 3, the curl diameter φ1 of the chips generated in Example was 15.0 mm, and the curl diameter φ2 of the chips generated in Comparative Example was 11.0 mm, meaning that the chips of Example were larger than the chips of Comparative Example.

Further, from portions surrounded by broken lines in FIGS. 9B, 10B, and 11B, in all of Tests 1, 2, and 3, bending (including extreme bending) was confirmed at the root of the chips in Comparative Example.

On the other hand, no bending was confirmed at the root of the chips in Example, and the shape of the chips was naturally extended from the curled part. In particular, in Comparative Examples of Test 2 and Test 3, not only the root portion of the chips was bent, but also the breakage occurred. Since the shape of the chips is directly related to the discharge performance of the chips, it was found that the discharge performance of the chips was better in Examples without the bending or the breakage than in Comparative Examples.

The embodiment of the present invention has been described above; however, the configurations and the combination thereof in the embodiment are merely examples, and additions, omissions, substitutions, and other changes of configuration can be made without departing from the concept of the present invention. In addition, the present invention is not limited by the embodiment.

REFERENCE SIGNS LIST

1: Cutting insert
2: Rake surface
3: Seating surface
4: First plane
5: Breaker
5*a*: First inclined surface
5*b*: Second inclined surface
7: Attachment hole
10: Side surface
11: Upper flank surface
11: Flank surface (upper flank surface)
15: Flank surface
20: Cutting Edge portion
21: Main cutting edge
22: Sub-cutting edge
23: Corner edge
30: Edge-replaceable rotary cutting tool
31: Tool body
33: Insert attachment seat
CO: Center line
JO: Tool rotation axis
L11, L12, L13, L14: Distance in cross-sectional view
L1, L2: Distance in plain view
S: Deepest portion
θ1, θ2, θ3: Angle

What is claimed is:

1. A cutting insert of a positive type that is attached to a tool body rotating around a rotation axis and that has a polygonal plate shape rotationally symmetrical with respect to a center line extending in a thickness direction, the cutting insert comprising:

a rake surface that constitutes one of a pair of polygonal surfaces;

a seating surface that constitutes the other of the pair of polygonal surfaces;

a side surface that connects the rake surface and the seating surface;

a cutting edge portion that is formed at an intersecting ridge between the rake surface and the side surface and that includes a main cutting edge located at a side part of the rake surface, a sub-cutting edge connected to one end side of the main cutting edge, and a corner edge connected to an end part of the sub-cutting edge on an opposite side to a main cutting edge side and located at a corner part of the rake surface; and an attachment hole that penetrates the cutting insert in the thickness direction and that is used for attaching the cutting insert to the tool body, wherein the rake surface is formed with a first plane parallel to the seating surface, an outer periphery of the first plane includes a plurality of curved portions having different radii of curvature, and the outer periphery of the first plane in the vicinity of the corner part is formed to project toward the side surface of the cutting insert in the vicinity of the corner part, on the rake surface, a breaker including a first inclined surface and a second inclined surface is provided between the cutting edge portion and the first plane around an entire circumference of the cutting insert, and when a distance from the seating surface to a tip of the cutting edge portion in the thickness direction is denoted by L11, a distance from the seating surface to the first plane in the thickness direction is denoted by L12, and a distance from the seating surface to a deepest portion of the breaker in the thickness direction is denoted by L13, a relationship of L11>L12>L13 is satisfied over an entire circumference of the cutting edge portion.

2. The cutting insert according to claim 1, wherein a difference between the distance L11 and the distance L12 is within a range of 0.01 mm or more and less than 0.15 mm, and a difference between the distance L11 and the distance L13 is within a range of 0.15 mm or more and 0.25 mm or less.

3. The cutting insert according to claim 1, wherein the side surface is configured of two flank surfaces separated in the thickness direction, and when the flank surface closer to the first plane out of the two flank surfaces is defined as an upper flank surface, in a side view seen in a direction intersecting the thickness direction, a distance L14 from a lower end of the upper flank surface to the tip of the cutting edge portion in a cross section passing through the corner edge and a distance L15 from the lower end of the upper flank surface to the tip of the cutting edge portion in a cross section passing through the main cutting edge satisfy L14≥L15.

4. The cutting insert according to claim 1, wherein the first inclined surface has a multi-stage configuration having a plurality of angles.

5. The cutting insert according to claim 1, wherein the first plane has an outer periphery including a linear part and a protruding part that are alternately arranged around an axis of the center line, and in a plan view seen in a direction facing the first plane, when a shortest distance from a boundary between the main cutting edge and the sub-cutting edge that are adjacent to each other in a circumferential direction to the first plane is denoted by L1 and a shortest distance from a boundary between the corner edge and the main cutting edge to the first plane is denoted by L2, a relationship of L1<L2 is satisfied.

6. The cutting insert according to claim 1, wherein, when a diameter of an inscribed circle of the rake surface is denoted by D, the D and the L2 satisfy a relationship of 3.0≤D/L2≤6.5.

7. The cutting insert according to claim 1, wherein, in a plan view seen in a direction facing the first plane, a width of the first inclined surface is larger than a width of the second inclined surface.

8. The cutting insert according to claim 1, wherein, when seen in a direction perpendicular to the first plane, when a straight line connecting an intersection point of extension lines of the main cutting edges that are adjacent to each other and the center line is defined as a first straight line, and a point where the first straight line passes through the corner edge is defined as a first vertex, a shape formed by connecting the first vertices of a plurality of the corner edges is a regular polygon, when a vertex of the protruding part that is farthest from the attachment hole is defined as a second vertex, a shape formed by connecting a plurality of the second vertices is also a regular polygon, a phase shift occurs around the center line between the regular polygon formed by connecting the first vertices and the regular polygon formed by connecting the second vertices, and the first straight line and a second straight line that is parallel to the first plane and that connects the second vertex through the center line intersect at the center line at an angle $\theta 3$.

9. A tool body that rotates around a tool rotation axis, wherein an insert attachment seat to which the cutting insert according to claim 1 is attachably and detachably attached is provided on a tip part of the tool body.

10. An edge-replaceable rotary cutting tool comprising:

the cutting insert according to claim 1; and a tool body having an insert attachment seat to which the cutting insert is attachably and detachably attached is provided on a tip part of the tool body, wherein, when the cutting insert is attached to the tool body such that the seating surface of the cutting insert contacts the insert attachment seat of the tool body, a cutting angle of the main cutting edge with respect to a work material is less than 45°.

11. The cutting insert according to claim 2, wherein the side surface is configured of two flank surfaces separated in the thickness direction, and when the flank surface closer to the first plane out of the two flank surfaces is defined as an upper flank surface, in a side view seen in a direction intersecting the thickness direction, a distance $L14$ from a lower end of the upper flank surface to the tip of the cutting edge portion in a cross section passing through the corner edge and a distance $L15$ from the lower end of the upper flank surface to the tip of the cutting edge portion in a cross section passing through the main cutting edge satisfy $L14 \geq L15$.

12. The cutting insert according to claim 2, wherein the first inclined surface has a multi-stage configuration having a plurality of angles.

13. The cutting insert according to claim 3, wherein the first inclined surface has a multi-stage configuration having a plurality of angles.

14. The cutting insert according to claim 2, wherein the first plane has an outer periphery including a linear part and a protruding part that are alternately arranged around an axis of the center line, and in a plan view seen in a direction facing the first plane, when a shortest distance from a boundary between the main cutting edge and the sub-cutting edge that are adjacent to each other in a circumferential direction to the first plane is denoted by $L1$ and a shortest distance from a boundary between the corner edge and the main cutting edge to the first plane is denoted by $L2$, a relationship of $L1 < L2$ is satisfied.

15. The cutting insert according to claim 3, wherein the first plane has an outer periphery including a linear part and a protruding part that are alternately arranged around an axis of the center line, and in a plan view seen in a direction facing the first plane, when a shortest distance from a boundary between the main cutting edge and the sub-cutting edge that are adjacent to each other in a circumferential direction to the first plane is denoted by $L1$ and a shortest distance from a boundary between the corner edge and the main cutting edge to the first plane is denoted by $L2$, a relationship of $L1 < L2$ is satisfied.

16. The cutting insert according to claim 2, wherein, when a diameter of an inscribed circle of the rake surface is denoted by D, the D and the $L2$ satisfy a relationship of $3.0 \leq D/L2 \leq 6.5$.

17. The cutting insert according to claim 2, wherein, in a plan view seen in a direction facing the first plane, a width of the first inclined surface is larger than a width of the second inclined surface.

18. The cutting insert according to claim 2, wherein, when seen in a direction perpendicular to the first plane, when a straight line connecting an intersection point of extension lines of the main cutting edges that are adjacent to each other and the center line is defined as a first straight line, and a point where the first straight line passes through the corner edge is defined as a first vertex, a shape formed by connecting the first vertices of a plurality of the corner edges is a regular polygon, when a vertex of the protruding part that is farthest from the attachment hole is defined as a second vertex, a shape formed by connecting a plurality of the second vertices is also a regular polygon, a phase shift occurs around the center line between the regular polygon formed by connecting the first vertices and the regular polygon formed by connecting the second vertices, and the first straight line and a second straight line that is parallel to the first plane and that connects the second vertex through the center line intersect at the center line at an angle $\theta 3$.

19. A tool body that rotates around a tool rotation axis, wherein an insert attachment seat to which the cutting insert according to claim 2 is attachably and detachably attached is provided on a tip part of the tool body.

20. An edge-replaceable rotary cutting tool comprising:

the cutting insert according to claim 2; and a tool body having an insert attachment seat to which the cutting insert is attachably and detachably attached is provided on a tip part of the tool body, wherein, when the cutting insert is attached to the tool body such that the seating surface of the cutting insert contacts the insert attachment seat of the tool body, a cutting angle of the main cutting edge with respect to a work material is less than 45°.

* * * * *